(12) United States Patent
Smith

(10) Patent No.: US 9,914,275 B1  
(45) Date of Patent: Mar. 13, 2018

(54) THERMALLY-CONDUCTIVE HOT PRESS ASSEMBLY

(71) Applicant: Akebono Brake Corporation, Farmington Hills, MI (US)

(72) Inventor: Kevin L. Smith, Glasgow, KY (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 442 days.

(21) Appl. No.: 14/549,260

(22) Filed: Nov. 20, 2014

(51) Int. Cl.
| | | |
|---|---|---|
| B30B 15/00 | (2006.01) |
| F16D 69/02 | (2006.01) |
| B30B 11/04 | (2006.01) |
| B30B 15/02 | (2006.01) |
| B30B 15/08 | (2006.01) |
| B29C 43/52 | (2006.01) |
| B30B 15/06 | (2006.01) |
| B29C 33/02 | (2006.01) |
| B29C 33/08 | (2006.01) |
| B30B 15/34 | (2006.01) |

(52) U.S. Cl.
CPC .......... *B30B 15/022* (2013.01); *B30B 11/04* (2013.01); *B30B 15/08* (2013.01); *F16D 69/02* (2013.01); *B29C 33/02* (2013.01); *B29C 33/08* (2013.01); *B29C 43/52* (2013.01); *B29C 2043/522* (2013.01); *B29C 2043/525* (2013.01); *B29C 2043/527* (2013.01); *B30B 15/064* (2013.01); *B30B 15/34* (2013.01)

(58) Field of Classification Search
CPC ....... B30B 15/022; B30B 15/08; B30B 11/04; B30B 15/064; B30B 15/34; F16D 69/02; B29C 43/52; B29C 2043/522; B29C 2043/525; B29C 2043/527; B29C 33/02; B29C 33/08

See application file for complete search history.

(56) References Cited

U.S. PATENT DOCUMENTS

| | | | | |
|---|---|---|---|---|
| 3,393,292 A | * | 7/1968 | Ritscher | ............... B30B 15/064 100/326 |
| 3,419,939 A | * | 1/1969 | Shelby | .................... B29C 33/02 219/221 |
| 3,497,173 A | * | 2/1970 | Valyi | .................. B22D 17/2218 165/179 |

(Continued)

FOREIGN PATENT DOCUMENTS

| | | | |
|---|---|---|---|
| JP | 5-91820 | * | 12/1993 |
| JP | 5337997 | | 12/1993 |
| JP | 2005138366 | | 6/2005 |

*Primary Examiner* — Jeffrey Wollschlager  
(74) *Attorney, Agent, or Firm* — Stites & Harbison, PLLC; Terry L. Wright

(57) ABSTRACT

A hot press assembly is provided that comprises an upper die plate having a first surface and a second surface opposite the first surface. The hot press assembly further includes a punch with an attachment surface that is positioned adjacent to the second surface of the upper die plate and a pressing surface that is positioned opposite the attachment surface. The hot press assembly also includes one or more conductive inserts that extend through the punch from the attachment surface to a predetermined distance away from the pressing surface, where each conductive insert has a thermal conductivity greater than a thermal conductivity of the punch. Methods of manufacturing a brake pad using the hot press assembly are also provided.

16 Claims, 39 Drawing Sheets

(56) References Cited

U.S. PATENT DOCUMENTS

| | | | |
|---|---|---|---|
| 3,889,363 A * | 6/1975 | Davis | B29C 33/0033 |
| | | | 156/150 |
| 5,004,089 A * | 4/1991 | Hara | B29C 43/021 |
| | | | 192/107 M |
| 5,020,770 A * | 6/1991 | Moberg | B29C 33/02 |
| | | | 249/111 |
| 5,358,211 A * | 10/1994 | Sterett | B29C 33/02 |
| | | | 249/111 |
| 5,395,573 A | 3/1995 | Taguchi | |
| 5,603,871 A | 2/1997 | Koseko et al. | |
| 5,775,402 A | 7/1998 | Sachs et al. | |
| 6,354,361 B1 | 3/2002 | Sachs et al. | |
| 6,413,068 B1 | 7/2002 | Steidl et al. | |
| 7,199,337 B2 | 4/2007 | Torisawa | |
| 7,278,197 B2 | 10/2007 | Manuel et al. | |
| 8,108,982 B2 | 2/2012 | Manuel et al. | |
| 9,108,341 B2 * | 8/2015 | Sugie | B29C 33/02 |
| 2006/0249872 A1 | 11/2006 | Manuel et al. | |
| 2007/0102837 A1 | 5/2007 | Manuel et al. | |
| 2009/0236037 A1 * | 9/2009 | Fisher | H01L 23/373 |
| | | | 156/272.2 |
| 2010/0024667 A1 * | 2/2010 | Ikura | B30B 15/067 |
| | | | 100/38 |
| 2013/0040012 A1 | 2/2013 | Sugie et al. | |
| 2013/0113141 A1 * | 5/2013 | Sorensen | B29C 33/02 |
| | | | 264/404 |
| 2014/0004222 A1 * | 1/2014 | Sorensen | B22F 3/1055 |
| | | | 425/547 |
| 2015/0266220 A1 * | 9/2015 | Fideu | B29C 33/02 |
| | | | 264/328.16 |

* cited by examiner

THERMALLY-CONDUCTIVE HOT PRESS ASSEMBLY

TECHNICAL FIELD

The present invention relates to hot press assemblies and methods of manufacturing a brake pad with the same. In particular, the present invention relates to hot press assemblies that make use of thermally-conductive inserts to control temperature variability and heat distribution across at least the punch of the hot press assembly.

BACKGROUND

Brake pads including, for example, those used in automotive vehicles, are typically made of a steel backing plate and a compressed friction material. The compressed friction material is bound to one surface of the steel backing plate and is configured to make contact with the metal brake rotor of a vehicle and provide the requisite stopping force on the wheel of the vehicle. In this regard, brake pads are often chosen depending upon the particular vehicle, with the hardness and compressibility of the friction material in the brake pad being tailored to improve the performance of the brake pad for the particular vehicle and the uses of that vehicle.

To control the hardness and compressibility of the friction material in a brake pad, the manufacturing of brake pads is typically performed through the use of a hot press assembly that heats and compresses an amount of powdered friction material against a metal backing plate to thereby form the brake pad. By using such a hot press assembly, variability between brake pads produced for a particular vehicle or application can be minimized as the hot press assembly tightly controls both the amount of pressure being applied to the powdered friction material and the amount of time that pressure is applied to the powdered friction material. Variability between brake pads for a particular vehicle or application, however, is also affected by temperature variability and heat distribution in the hot press assembly, and, to date, few improvements have been made to existing hot press assemblies to reduce such temperature variability and heat distribution throughout the manufacturing process.

SUMMARY

The present invention relates to hot press assemblies and methods of manufacturing a brake pad with the same. In particular, the present invention relates to hot press assemblies that make use of thermally-conductive inserts to control temperature variability and heat distribution across at least the punch the hot press assembly.

In one exemplary embodiment of the present invention, a hot press assembly is provided that comprises a heat platen including a plurality of heating elements extending through the heat platen. The hot press assembly further includes an upper die plate having a first surface positioned adjacent to and immediately below the heat platen, and a second surface opposite the first surface. The upper die plate also includes one or more groups of bridge inserts that each extend through the upper die plate from the first surface to the second surface, such that each bridge insert is operably connected to and is in thermal contact with the heat platen at the first surface of the upper die plate. The upper die plate also defines several attachment holes that are positioned throughout the upper die plate, and that are used to bolt together the various portions of the hot press assembly.

Further included in the exemplary hot press assembly are four, substantially identical punches that are positioned below and are attached to the upper die plate with one of the four punches positioned below each group of bridge inserts. Each of the four punches includes an attachment surface, which directly contacts and is attached to the second surface of the upper die plate, and a pressing surface, which, during use of the hot press assembly, contacts and compresses a friction material. Each punch further includes one or more conductive inserts that extend through each of the punches from the attachment surface of each punch to a predetermined distance away from the pressing surface of each punch. In this regard, each of the conductive inserts in the punches is further aligned with and is operably connected to a particular one of the bridge inserts of the upper die plate, such that, together, the conductive inserts and the bridge inserts provide a path by which any heat present in the heat platen and its associated heating elements can travel and then be distributed throughout the upper die plate and throughout each of the punches.

As indicated above, each of the punches is connected to the upper die plate, which is, in turn, connected to the heat platen. In this way, the punches, the upper die plate, and the heat platen form, at least in part, an upper portion of the hot press assembly. Further included in the hot press assembly, however, is a lower portion that includes a lower die plate and a middle die plate, which rests upon the lower die plate and defines cavities that are configured to both hold an amount of powdered friction material and to receive the pressing surfaces of the punches as the upper portion of the hot press assembly moves up and down relative to the lower portion of the hot press assembly in the manufacturing of a brake pad.

To thermally mold a friction material to a backing plate and form a brake pad, and in operation of the exemplary hot press assembly, an amount of electrical current is initially supplied to the heating elements in the heat platen such that the heat platen and the upper die plate and the punches, by virtue of the bridge inserts and/or conductive inserts included in the upper die plate and the punches, are quickly and uniformly heated to a stable operational temperature. Once the operational temperature has been reached, backing plates are placed on the lower die plate of the hot press assembly. Then, the middle die plate is positioned over the backing plates, such that the cavities defined by the middle die plate cover a portion of the backing plates. In this regard, a friction material is subsequently positioned atop each of the backing plates and is contained within the cavities of the middle die plate by virtue of the middle die plate covering a portion of the backing plates.

After positioning the backing plates, the friction material, and the middle die plate in such a manner, the upper portion of the hot press assembly is moved downward, such as by a hydraulic cylinder, to insert the pressing surfaces of the punches into the corresponding cavities of the middle die plate and thereby contact the friction material that is positioned in each of the cavities. As the upper portion of the hot press assembly is moved further downward, the pressing surface of each punch applies pressure and heat to the friction material, thereby compressing and heating the friction material until the friction material is thermally molded and is bonded to the respective backing plates to form brake pads. After the friction material is hot pressed to the backing plates, the resultant brake pad can then be removed from the hot press assembly and undergo several additional manufacturing steps, such as curing in an oven to improve the physical properties of the friction material, grinding to develop a specific geometry that improves the performance of the brake pads throughout their operational life, and/or scorching to improve the initial performance of the brake pads.

Further features and advantages of the present invention will become evident to those of ordinary skill in the art after a study of the description, figures, and non-limiting examples in this document.

DESCRIPTION OF EXEMPLARY EMBODIMENTS

Figure 1:
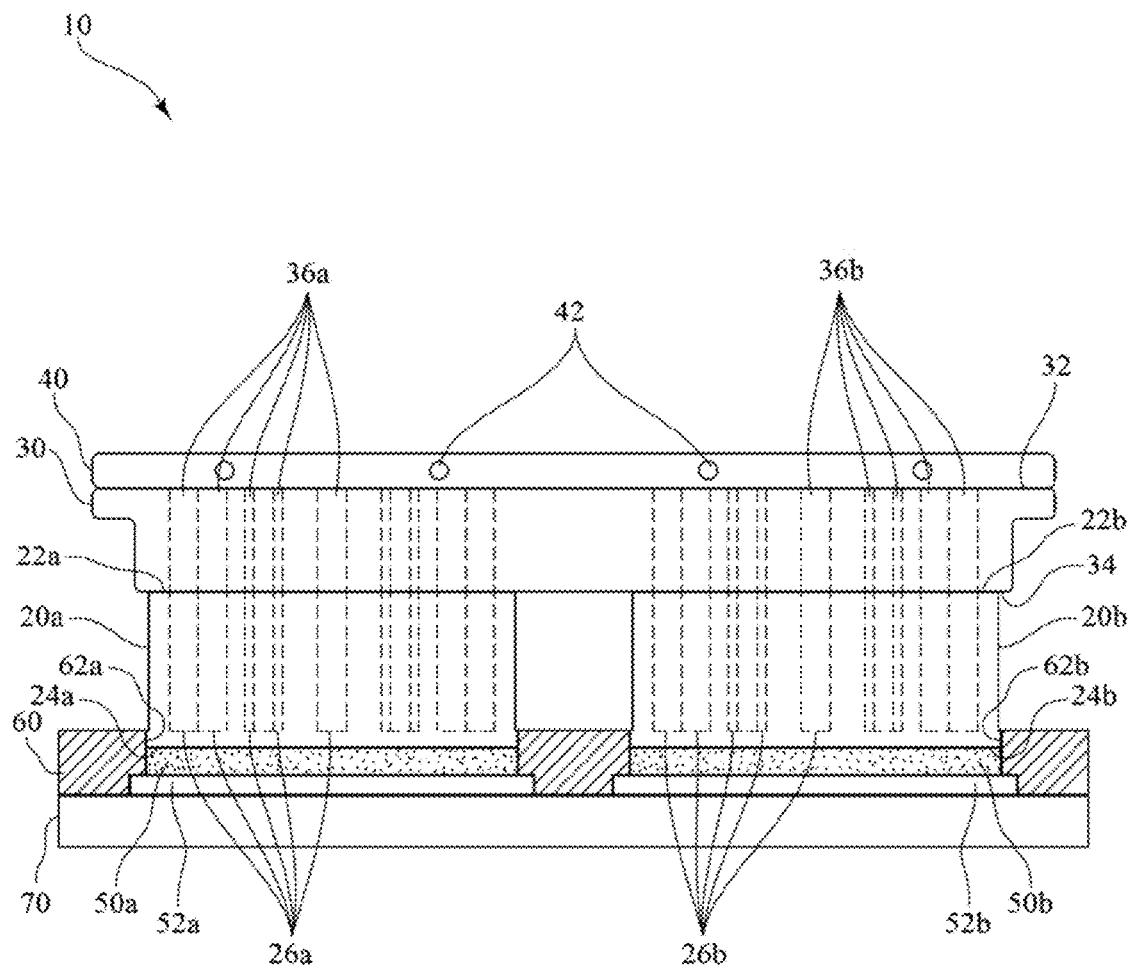
FIG. 1 is a side view of an exemplary hot press assembly made in accordance with the present invention, and showing a portion of the middle die plate of the hot press assembly partially cut away.
Figure 2A:
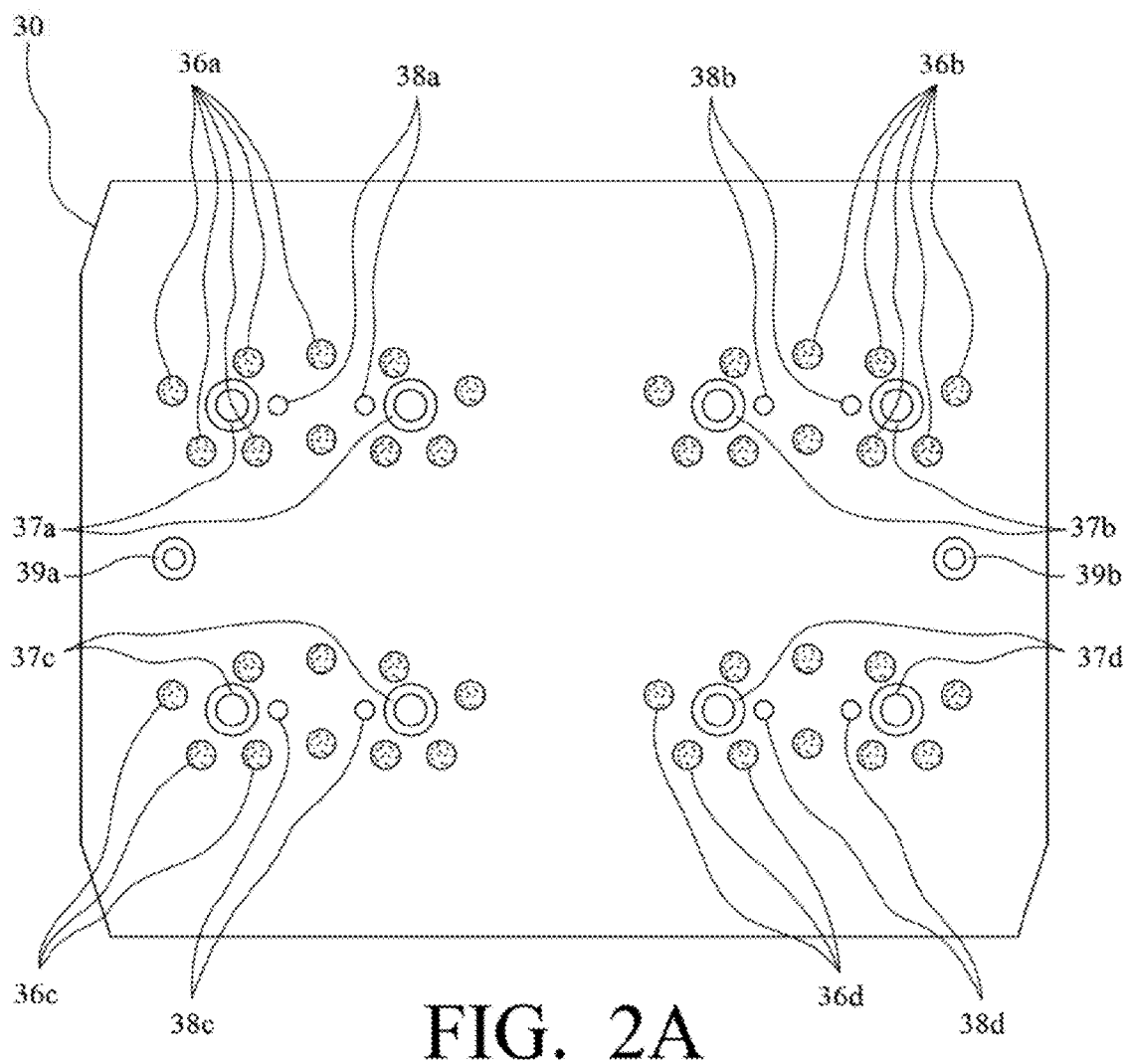
FIG. 2A is a top view of the upper die plate of the exemplary hot press assembly shown in FIG. 1 and showing bridge inserts positioned in the upper die plate.
Figure 2B:
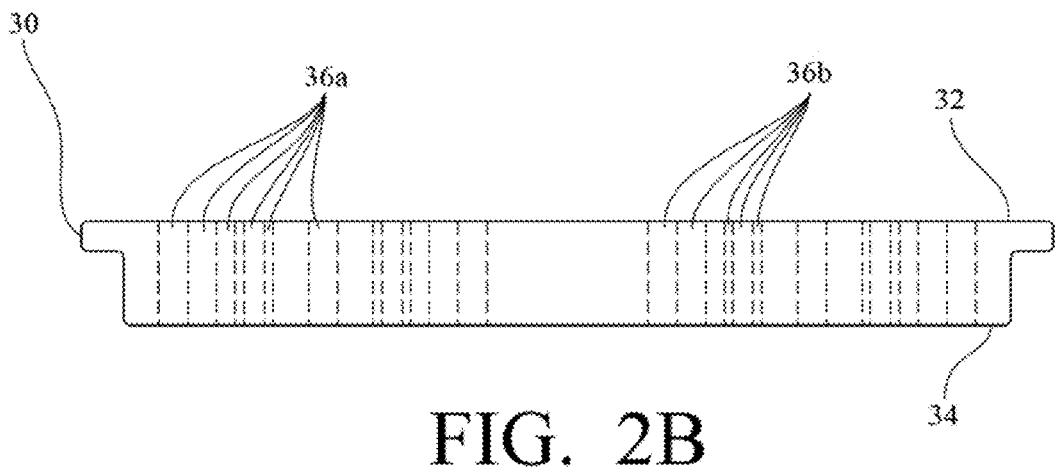
FIG. 2B is a side view of the upper die plate of the exemplary hot press assembly of FIG. 1, and showing the bridge inserts in dashed lines extending through the upper die plate.

The present invention relates to hot press assemblies and methods of manufacturing a brake pad with the same. In particular, the present invention relates to hot press assemblies that make use of thermally-conductive inserts to control temperature variability and heat distribution across at least the punch the hot press assembly.

Referring first to FIGS. 1, 2A-2B, and 3A-3B, in one exemplary embodiment of the present invention, a hot press assembly 10 is provided that comprises a heat platen 40 including a plurality of heating elements 42 extending through the heat platen 40. The hot press assembly 10 further includes an upper die plate 30 having a first surface 32 positioned adjacent to and immediately below the heat platen 40 and a second surface 34 opposite the first surface 32. The the upper die plate 30 includes four groups of ten bridge inserts 36a, 36b, 36c, 36d that each extend through the upper die plate 30 from the first surface 32 to the second surface 34 of the upper die plate 30, such that each bridge insert 36a, 36b, 36c, 36d is operably connected to and is in thermal contact with the heat platen 40 at the first surface 32 of the upper die plate 30. The upper die plate 30 also defines several attachment holes positioned throughout the upper die plate 30. Specifically, the upper die plate 30 defines two central attachment holes 39a, 39b located along a central axis of the upper die plate 30, as well as two large attachment holes 37a, 37b, 37c, 37d and two small attachment holes 38a, 38b, 38c, 38d positioned in proximity to each group of ten bridge inserts 36a, 36b, 36c, 36d. Although not shown in FIGS. 1, 2A-2B, and 3A-3B, each of the central attachment holes 39a, 39b, the large attachment holes 37a, 37b, 37c, 37d, and the small attachment holes 38a, 38b, 38c, 38d extend through the upper die plate 30 and are used to bolt together the various portions of the hot press assembly 10.

Further included in the hot press assembly 10 are four, substantially identical punches that are positioned below and are attached to the upper die plate 30 with one of the four punches positioned below each group of ten bridge inserts 36a, 36b, 36c, 36d. FIG. 1 shows a side view of two of the four punches in the form of a first punch 20a and a second punch 20b, as both the third punch and the fourth punch of the four punches of the hot press assembly 10 would be positioned and aligned directly behind the first punch 20a and the second punch 20b. As shown in FIG. 1, and as examples of the punches included in the hot press assembly 10, both the first punch 20a and the second punch 20b include an attachment surface 22a, 22b, which directly contacts and is attached to the second surface 34 of the upper die plate 30, and a pressing surface 24a, 24b, which, during use of the hot press assembly 10, contacts and compresses a friction material 50a, 50b, as shown in FIG. 1 and as described in further detail below. The first punch 20a and the second punch 20b each further include conductive inserts 26a, 26b that extend through the first punch 20a and the second punch 20b from the attachment surface 22a, 22b of each of the punches 20a, 20b to a predetermined distance away from the pressing surface 24a, 24b of each of the punches 20a, 20b. In this regard, each of the conductive inserts 26a, 26b in the first punch 20a and the second punch 20b is further aligned with and is operably connected to a particular one of the bridge inserts 36a, 36b of the upper die plate 30, such that, together, the conductive inserts 26a, 26b and the bridge inserts 36a, 36b, provide a path by which any heat present in the heat platen 40 and its associated heating elements 42 can travel and then be distributed throughout the upper die plate 30 and throughout each of the punches 20a, 20b, as also described in further detail below.

Figure 3A:
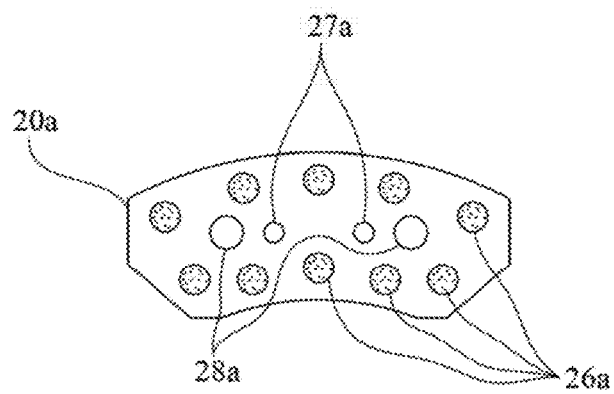
FIG. 3A is a top view of a punch of the exemplary hot press assembly of FIG. 1, and showing conductive inserts positioned in the punch.
Figure 3B:
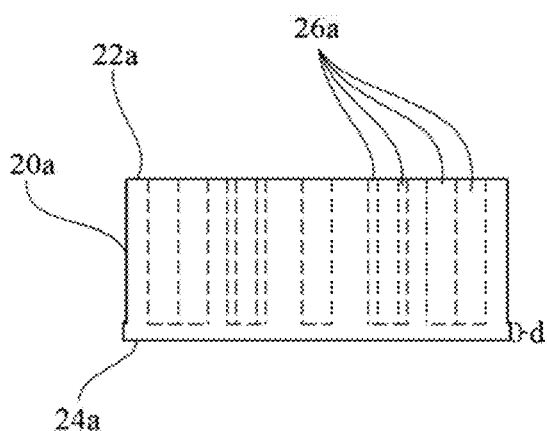
FIG. 3B is a side view of a punch of the exemplary hot press assembly of FIG. 1, and showing the conductive inserts in dashed lines extending through the punch.

Referring now more specifically to FIGS. 3A-3B and as an example of one of the four, substantially identical punches included in the hot press assembly 10, FIGS. 3A-3B are detailed views of the first punch 20a. As shown in FIGS. 3A-3B, the first punch 20a includes ten conductive inserts 26a that are configured and positioned in the first punch 20a such that the conductive inserts 26a are spaced apart from one another and from the sides of the first punch 20a in a manner that increases the heat distribution across the first punch 20a without sacrificing the strength of the first punch 20a. Specifically, in the first punch 20a, each of the conductive inserts 26a are positioned a distance of about 10 mm to about 20 mm away from the sides of the first punch 20a as well as from each of the adjacent conductive inserts 26a. Similarly, the conductive inserts 26a in the first punch 20a also do not extend all of the way through the first punch 20a from the attachment surface 22a to the pressing surface 24a. Rather, each of the conductive inserts 26a in the first punch 20a extend to a predetermined distance, d, away from the pressing surface 24a of the first punch. In this regard, each of the conductive inserts typically extend about 1 mm to about 10 mm (e.g., 5 mm) away from the pressing surface 24a to allow sufficient heat distribution throughout the entirety of the first punch 20a, including the pressing surface 24a, while still allowing the pressing surface 24a to remain a continuous, substantially flat surface that can be used to compress a powdered friction material as described below.

Referring now to FIGS. 1, 2A-2B, and 3A-3B, the first punch 20a, which again is substantially identical to the remainder of the punches included in the hot press assembly 10, defines two small attachment bores 27a and two large attachment bores 28a that extend through the first punch 20a and that are used to connect the first punch 20a to the upper die plate 30. Specifically, the two small attachment bores 27a and the two large attachment bores 28a are positioned in the first punch 20a such that, upon putting together the various components of the hot press assembly 10, the two small attachment bores 27a and the two large attachment bores 28a are aligned, respectively, with the small attachment holes 38a and the large attachment holes 37a defined by the upper die plate 30 to allow a bolt or other similar fastening means to be inserted through each of the small attachment bores 27a and the small attachment holes 38a, as well as through each of the large attachment bores 28a and the large attachment holes 37a, to secure the first punch 20a to the upper die plate 30. By aligning and securing the first punch 20a to the upper die plate 30 in such a manner, each bridge insert 36a positioned over the first punch 20a in the upper die plate 30 is aligned with and is placed in thermal contact with one of the conductive inserts 26a in the first punch 20a, as shown best in FIG. 1. In this way, upon generation of heat by the heating elements 42 in the heat platen 40, heat is then readily transferred from the heat platen 40 through the bridge inserts 36a and into the conductive inserts 26a of the first punch 20a such that heat diffuses throughout the upper die plate 30 and each of the punches 20a, 20b to reduce temperature variability and improve heat distribution throughout the hot press assembly 10.

With further respect to the upper die plate 30 and the first punch 20a and second punch 20b of the hot press assembly 10, the upper die plate 30 and the punches 20a, 20b are typically made of a sufficiently hard and durable material, such as steel, that is also capable of being heated and conducting an amount of heat. For example, in the embodiment shown in FIG. 1, the first punch 20a and the second punch 20b are comprised of SK3 steel, which is a forged carbon tool steel routinely used for dies and tools because of its favorable impact resistance, wear resistance, fatigue strength, and high temperature strength, but which also has a thermal conductivity of about 42.7 W/m-K. Of course, it is contemplated that a number of other sufficiently hard and durable materials, including a number of different types of steels and other metal alloys, can also be used in accordance with the present invention to produce an upper die plate and punches of a hot press assembly, and can readily be selected without departing from the spirit and scope of the subject matter described herein.

Unlike the upper die plate 30 and the first punch 20a and second punch 20b included in the hot press assembly 10, the bridge inserts 36a, 36b included in the upper die plate 30 and the conductive inserts 26a, 26b included in the first punch 20a and the second punch 20b are typically not comprised of steel, but are instead comprised of a material that has a higher thermal conductivity than steel and thus allows any heat present in the heat platen 40 to readily travel from the heat platen 40 into and through the upper die plate 30 and then into and through the first punch 20a and the second punch 20b. In this regard, and advantageously, the bridge inserts 36a, 36b and conductive inserts 26a, 26b included in the hot press assembly 10 are thus configured to allow the hot press assembly 10 to not only reach a desired operational temperature faster than a hot press assembly that does not make use of thermally-conductive inserts or bridge inserts, but the bridge inserts 36a, 36b and conductive inserts 26a, 26b of the hot press assembly 10 also allow heat to be more readily distributed throughout the hot press assembly 10 and the operational temperature of the hot press assembly 10, including the operational temperature of the upper die plate 30 and the first punch 20a and second punch 20b, to be maintained throughout the manufacturing process, as further described below. In the hot press assembly 10 shown in FIG. 1, to allow such heating and heat distribution, the bridge inserts 36a, 36b and the conductive inserts 26a, 26b are comprised of copper alloy C101, which has a thermal conductivity of about 391.1 W/m-K and is free of oxygen to reduce or prevent hydrogen embrittlement of the conductive inserts. It is also contemplated, however, that numerous other alloys of copper, as well as other materials, such as gold, silver, or the like, having a high thermal conductivity can also be used without departing from the spirit and scope of the present invention.

With further respect to the first punch 20a and second punch 20b included in the hot press assembly 10, the conductive inserts 26a, 26b and, in particular, the copper alloy that comprises the conductive inserts 26a, 26b, are typically present in the first punch 20a and second punch 20b in the form of copper rods and in an amount that allows heat to be readily distributed throughout the hot press assembly 10 and the operational temperature of the hot press assembly 10 to be maintained, without decreasing the hardness and durability of the first punch 20a and the second punch 20b and without impairing the ability of the hot press assembly 10 to sufficiently compress a powdered friction material and manufacture a brake pad. In this regard, in the first punch 20a and the second punch 20b, the conductive inserts 26a, 26b are typically comprised of copper rods having a diameter of about ¼ inch to ½ inch (e.g., ⅜ inch or 10 mm) and are included in each punch such that the conductive inserts comprise about 5% to about 20% of the volume of the first punch 20a and about 5% to about 20% of the volume of the second punch 20b. For example, in some embodiments, the conductive inserts 26a, 26b are comprised of copper rods having a diameter of about ⅜ inch and are included in each punch such that the conductive inserts comprise about 8% to about 10% of the volume of the first punch 20a and about 8% to about 10% of the volume of the second punch 20b.

Referring still to FIG. 1, as described above, both the first punch 20a and the second punch 20b are connected to the upper die plate 30, which is, in turn, connected to the heat platen 40. In this way, the punches 20a, 20b, the upper die plate 30, and the heat platen 40 form, at least in part, an upper portion of the hot press assembly 10. Further included in the hot press assembly 10, however, is a lower portion that is comprised of a lower die plate 70 and a middle die plate 60, which rests upon the lower die plate 70 and defines cavities 62a, 62b that are configured to both hold an amount of powdered friction material 50a, 50b and to receive the pressing surfaces 24a, 24b of the first punch 20a and the second punch 20b as the upper portion of the hot press assembly 10 moves up and down relative to the lower portion of the hot press assembly 10 in the manufacturing of a brake pad, as further described below.

To thermally mold a friction material to a backing plate and form a brake pad, and in operation of the hot press assembly 10, an amount of electrical current is initially supplied to the heating elements 42 in the heat platen 40 such that the heat platen 40, the upper die plate 30, and the first punch 20a and second punch 20b, by virtue of the bridge inserts 36a, 36b and conductive inserts 26a, 26b included in the upper die plate 30 and the first punch 20a and second punch 20b, are quickly and uniformly heated to a stable operational temperature. Once the operational temperature has been reached, backing plates 52a, 52b are placed on the lower die plate 70 of the hot press assembly 10. Then, the middle die plate 60 is positioned over the backing plates 52a, 52b, such that the cavities 62a, 62b defined by the middle die plate 60 extend over only a portion the backing plates 52a, 52b. In this regard, a friction material 50a, 50b is subsequently positioned atop each of the backing plates 52a, 52b and is contained within the cavities 62a, 62b of the middle die plate 60.

After positioning the backing plates 52a, 52b, the friction material 50a, 50b, and the middle die plate 60 in such a manner, the upper portion of the hot press assembly 10 is moved downward, such as by a hydraulic cylinder (not shown), to insert the pressing surfaces 24a, 24b of the first punch 20a and second punch 20b into the corresponding cavities 62a, 62b of the middle die plate 60 and thereby contact the friction material 50a, 50b that is positioned in each of the cavities 62a, 62b. As the upper portion of the hot press assembly 10 is moved further downward, the pressing surface 24a, 24b of each punch 20a, 20b applies pressure and heat to the friction material 50a, 50b, thereby compressing and heating the friction material 50a, 50b until the friction material 50a, 50b is thermally molded and is bonded to the respective backing plates 52a, 52b to form brake pads. After the friction material 50a, 50b is hot pressed to the backing plates 52a, 52b, the resultant brake pad can then be removed from the hot press assembly 10 and undergo several additional manufacturing steps, such as curing in an oven to improve the physical properties of the friction material, grinding to develop a specific geometry that improves the performance of the brake pads throughout their operational life, and/or scorching to improve the initial performance of the brake pads.

During a typical brake pad manufacturing process, hot press assemblies will generally perform multiple cycles to manufacture a number of brake pads within a given time frame. Specifically, after one set of brake pads is produced, the upper portion of a hot press assembly is generally raised, the finished brake pads are removed, and then a new set of backing plates and amount of friction material is positioned within the hot press assembly to produce further brake pads. Such a cycling of a hot press assembly can be performed in a relatively short amount of time and allow for the continuous production of brake pads. In going through the various cycles, however, heat can be lost from the pressing surfaces of punches of the hot press assemblies, which, in turn, requires that additional heat be generated by a heat platen of the hot press assembly. Such additional heat generation though then results in temperature variability and uneven heat distribution across the hot press assembly, with the average temperature in certain portions of the hot press assembly continually increasing due to the retention of heat between cycles and with the average temperature in other portions of the hot press assembly (e.g., the pressing surfaces of the punches) varying significantly due to the release of heat between each cycle. It has now been determined, however, that by including bridge inserts in the upper die plate and conductive inserts in the punches of an exemplary hot press assembly of the present invention not only can the time for the hot press assembly to initially reach a desired operational temperature be reduced, but the temperature variability and heat distribution across an exemplary hot press assembly can be maintained as well. In some embodiments of the present invention, by including bridge inserts in the upper die plate and conductive inserts in the punches of an exemplary hot press assembly, the operational temperature of an exemplary hot press assembly can be maintained between a temperature of about 150° C. and about 160° C. or, in some embodiments, within a temperature range of ±5° C. of a target temperature.

Figure 7A:
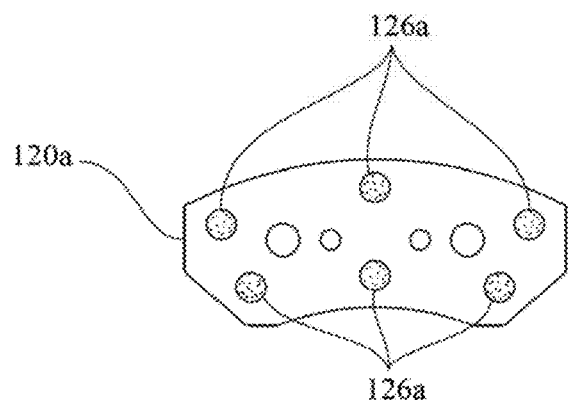
FIG. 7A is a top view of a punch of the exemplary hot press assembly of FIG. 5, and showing conductive inserts positioned in the punch.
Figure 7B:
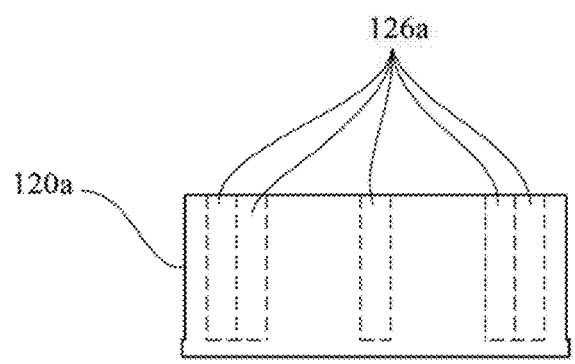
FIG. 7B is a side view of a punch of the exemplary hot press assembly of FIG. 5, and showing the conductive inserts in dashed lines extending through the punch.

As indicated above, the exemplary hot press assembly 10 shown in FIGS. 1, 2A-2B, and 3A-3B includes forty bridge inserts 36a, 36b, 36c, 36d in the upper die plate 30 and ten conductive inserts 26a, 26b in both the first punch 20a and second punch 20b, as well as in the remaining two punches of the hot press assembly that are not shown in FIGS. 1, 2A-2B, and 3A-3B. By including such an arrangement of bridge inserts 36a, 36b, 36c, 36d and conductive inserts 26a, 26b in the hot press assembly 10, the hot press assembly 10 is configured to tightly control the temperature variability and heat distribution across the hot press assembly 10 during multiple manufacturing cycles. As a refinement to the use of multiple bridge inserts and conductive inserts in an exemplary hot press assembly of the present invention, however, the exemplary hot press assemblies described herein can also make use of a number of different arrangements of bridge inserts and/or conductive inserts. For example, in another exemplary embodiment of the present invention, and referring now to FIGS. 5, 6A-6B, and 7A-7B, another hot press assembly 110 is provided that, like the exemplary hot press assembly 10 shown in FIG. 1, comprises a heat platen 140 including heating elements 142, an upper die plate 130, four, substantially identical punches including conductive inserts (with only a first punch 120a and a second punch 120b being shown in FIG. 5), a middle die plate 160, and a lower die plate 170. Unlike the hot press assembly 10 shown in FIG. 1, however, the hot press assembly 110 shown in FIGS. 5, 6A-6B, and 7A-7B does not make use of any bridge inserts positioned in the upper die plate 130. Furthermore, the hot press assembly 130 also does not make use of ten conductive inserts in each punch. Instead, and as shown best in the detailed view of the first punch 120a in FIG. 7A, the first punch 120a, as well as the remainder of the punches in the hot press assembly 110, only includes six conductive inserts 126a. In this regard, instead of relying on multiple bridge inserts and conductive inserts to transfer heat across the upper die plate and punches, the exemplary hot press assembly 130 relies on the thermal conductivity of the upper die plate 130 itself and on six conductive inserts positioned in each punch, as shown with the conductive inserts 126a, 126b positioned in both the first punch 120a and second punch 120b shown in FIG. 5.

Figure 5:
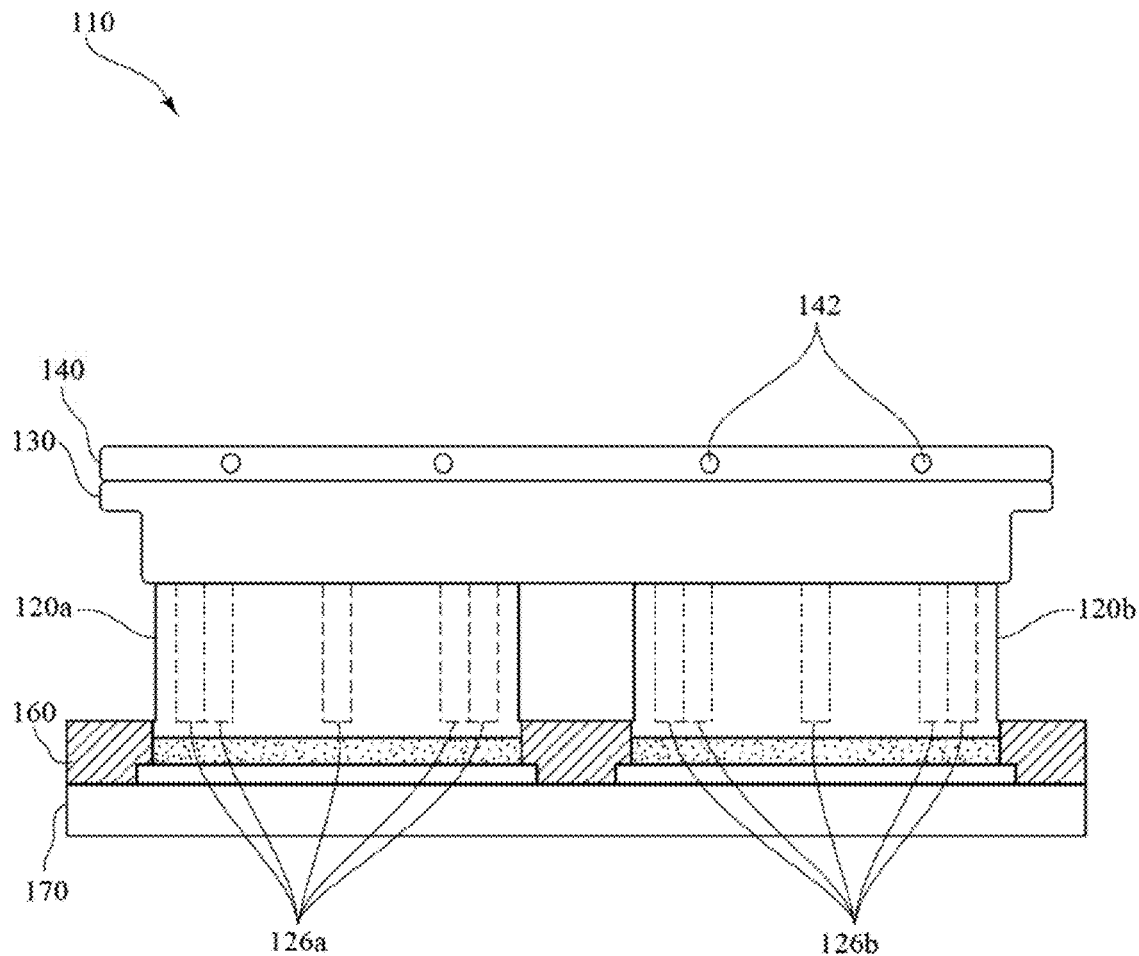
FIG. 5 is a side view of another exemplary hot press assembly made in accordance with the present invention, and showing a portion of the middle die plate of the hot press assembly partially cut away.
Figure 6A:
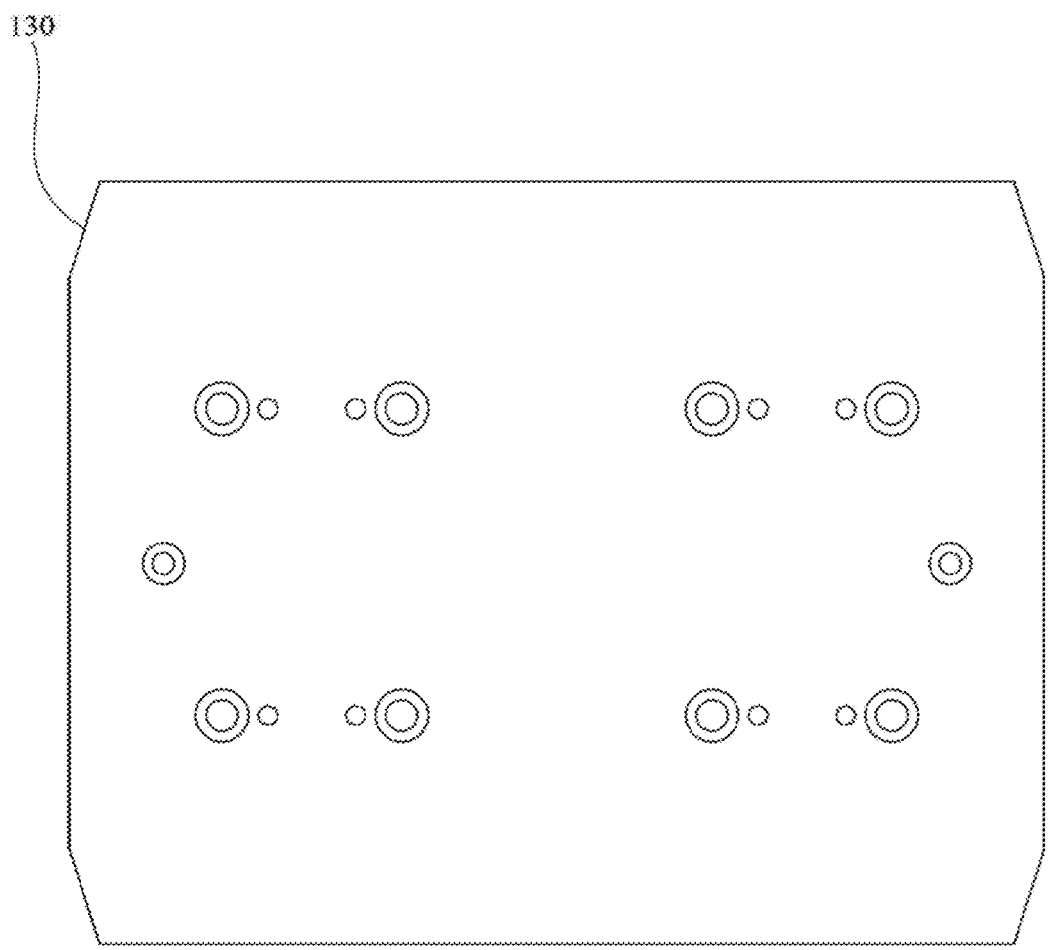
FIG. 6A is a top view of the upper die plate of the exemplary hot press assembly shown in FIG. 5 and showing no bridge inserts positioned in the upper die plate.
Figure 6B:
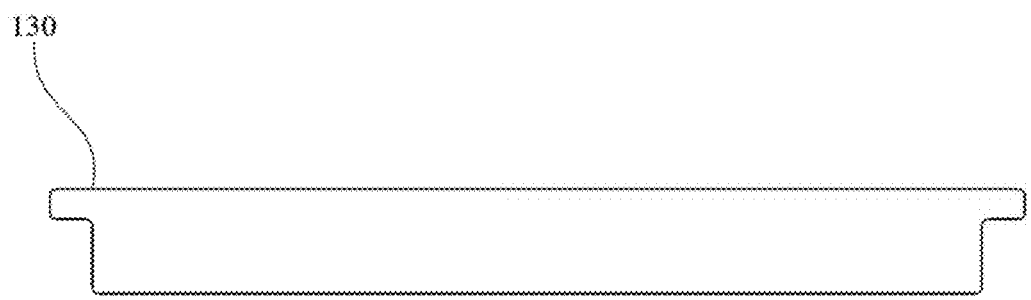
FIG. 6B is a side view of the upper die plate of the exemplary hot press assembly of FIG. 5.
Figure 9:
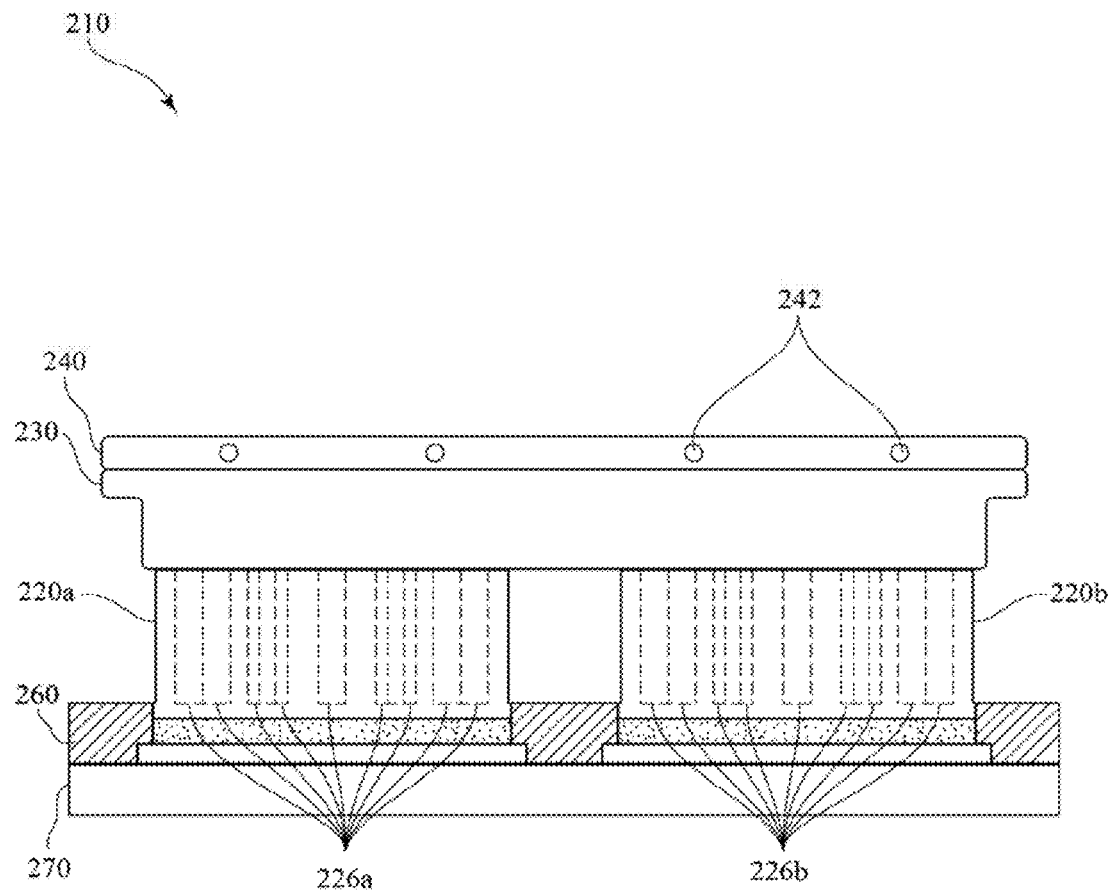
FIG. 9 is a side view of another exemplary hot press assembly made in accordance with the present invention, and showing a portion of the middle die plate of the hot press assembly partially cut away.
Figure 10A:
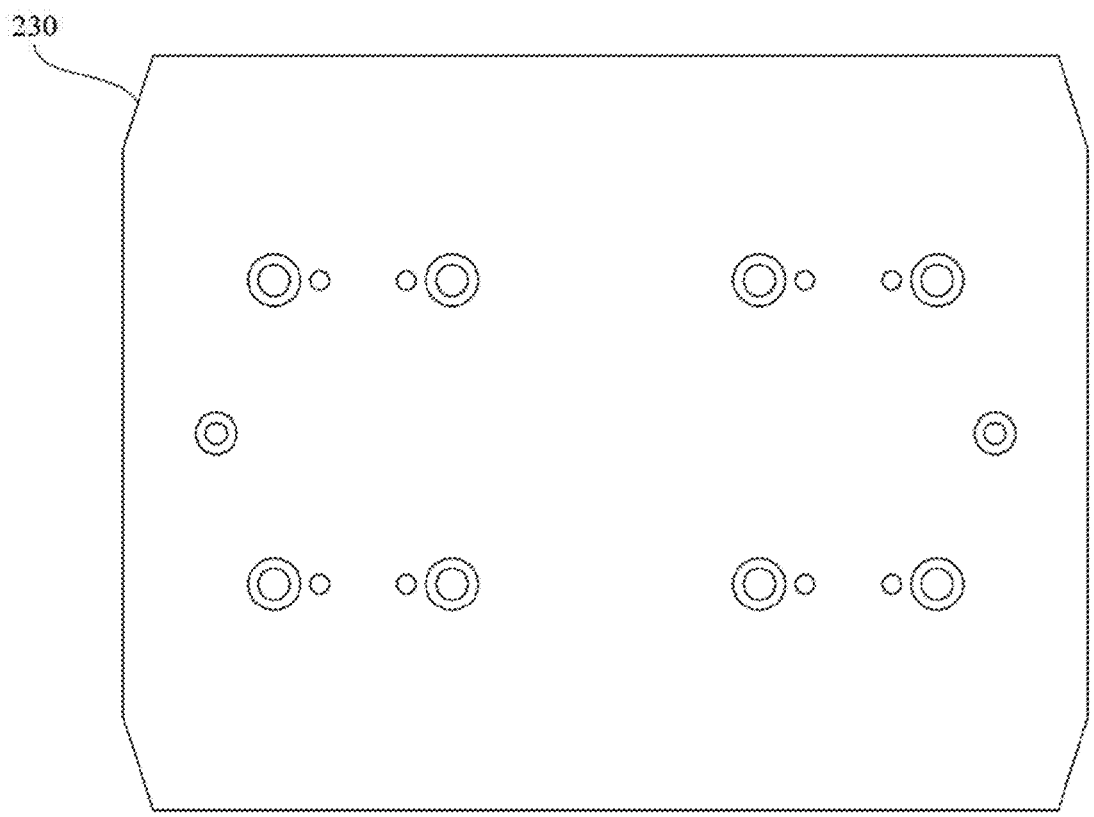
FIG. 10A is a top view of the upper die plate of the exemplary hot press assembly shown in FIG. 9 and showing no bridge inserts positioned in the upper die plate.
Figure 10B:
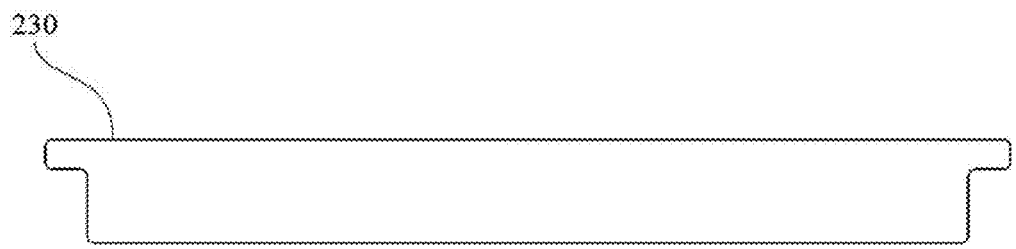
FIG. 10B is a side view of the upper die plate of the exemplary hot press assembly of FIG. 9.
Figure 11A:
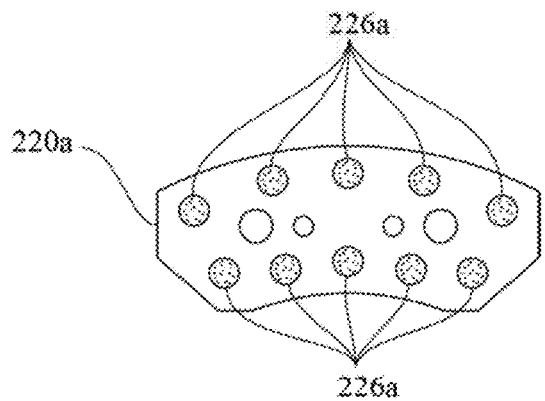
FIG. 11A is a top view of a punch of the exemplary hot press assembly of FIG. 9, and showing conductive inserts positioned in the punch.
Figure 11B:
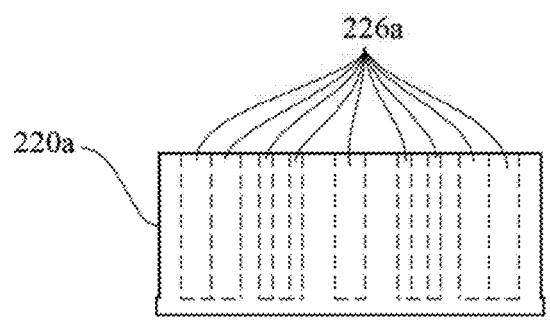
FIG. 11B is a side view of a punch of the exemplary hot press assembly of FIG. 9, and showing the conductive inserts in dashed lines extending through the punch.

As a further refinement to the hot press assemblies of the present invention, exemplary hot press assemblies can also be provided that, similar to the hot press assembly 130 shown in FIG. 5, make use of upper die plates that include no bridge inserts, but that further include an increased number of conductive inserts in the punches. For example, and referring now to FIGS. 9, 10A-10B, and 11A-11B, another hot press assembly 210 is provided that comprises a heat platen 240 including heating elements 242, an upper die plate 230 with no bridge inserts, four, substantially identical punches including conductive inserts (with only the first punch 220a and the second punch 220b and their respective conductive inserts 226a, 226b being shown in FIG. 9), a middle die plate 260, and a lower die plate 270. Rather than including six conductive inserts in each punch, however, and as shown best in the detailed view of the first punch 220a shown in FIG. 7A, the first punch 220a, as well as the remainder of the punches in the hot press assembly 210, includes ten conductive inserts 226a to provide an increased amount of heat distribution and transfer at least in the punches of the hot press assembly 210.

Figure 13:
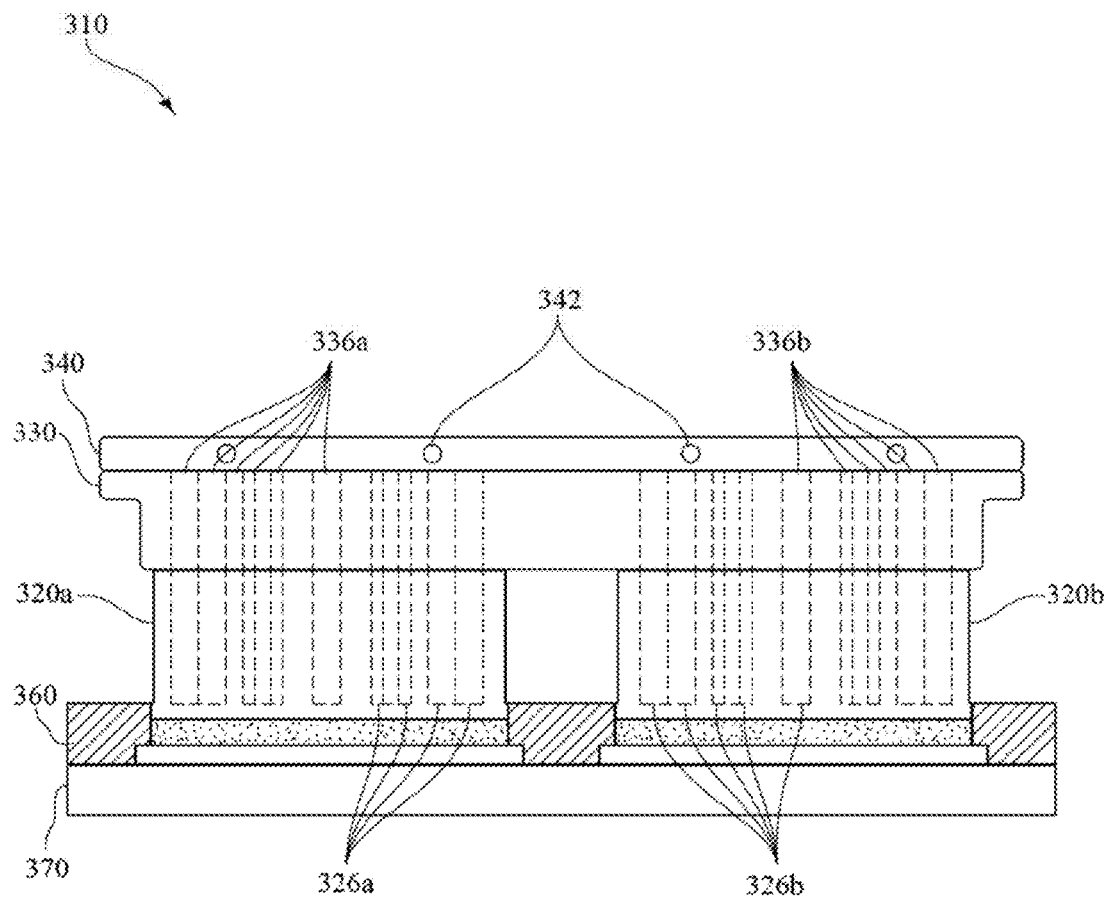
FIG. 13 is a side view of another exemplary hot press assembly made in accordance with the present invention, and showing a portion of the middle die plate of the hot press assembly partially cut away.
Figure 14A:
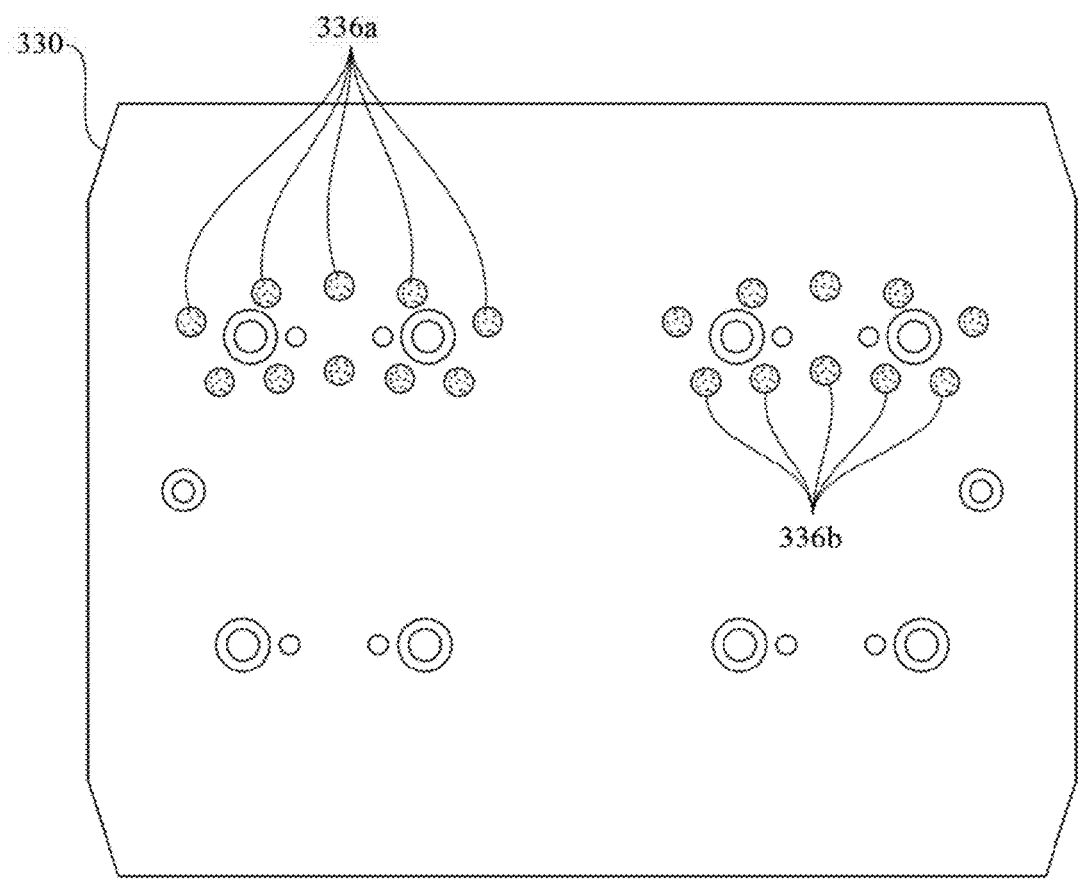
FIG. 14A is a top view of the upper die plate of the exemplary hot press assembly shown in FIG. 13 and showing bridge inserts positioned in a portion of the upper die plate.
Figure 14B:
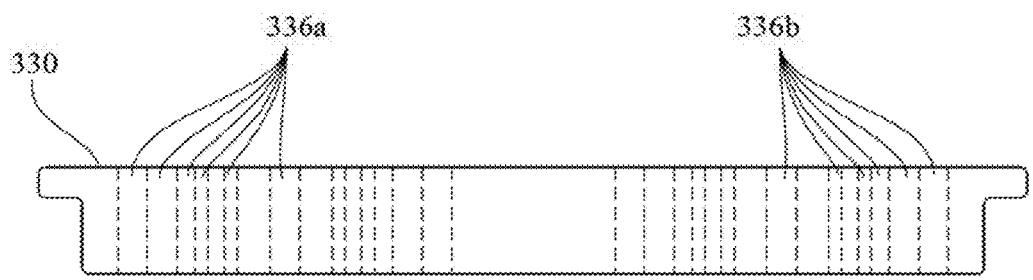
FIG. 14B is a side view of the upper die plate of the exemplary hot press assembly of FIG. 13, and showing the bridge inserts in dashed lines extending through the upper die plate.
Figure 15A:
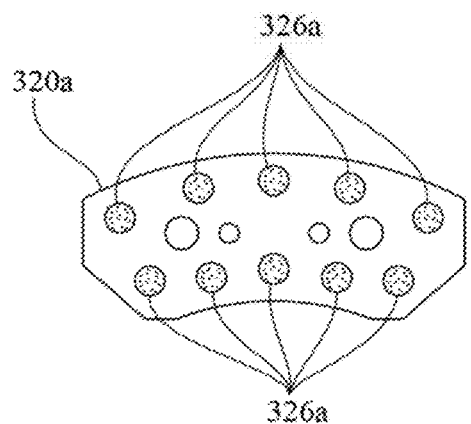
FIG. 15A is a top view of a punch of the exemplary hot press assembly of FIG. 13, and showing conductive inserts positioned in the punch.
Figure 15B:
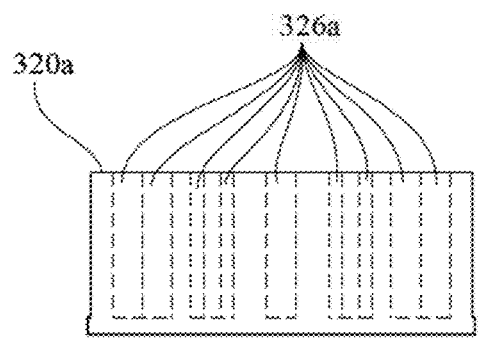
FIG. 15B is a side view of a punch of the exemplary hot press assembly of FIG. 13, and showing the conductive inserts in dashed lines extending through the punch.

As an even further refinement to the hot press assemblies of the present invention, in some embodiments, exemplary hot press assemblies can also be provided that include various combinations and configurations of bridge inserts and conductive inserts to provide varying levels of heat distribution and transfer across different portions of an exemplary hot press assembly. For instance, and referring now to FIGS. 13, 14A-14B, and 15A-15B, in a further embodiment of the present invention, another hot press assembly 310 is provided that also comprises a heat platen 340 including heating elements 342, an upper die plate 330, four, substantially identical punches that each include ten conductive inserts (with only the first punch 320a and the second punch 320b and their respective conductive inserts 326a, 326b being shown in FIG. 13), a middle die plate 360, and a lower die plate 370. As shown best in FIG. 14A, however, and unlike the upper die plate 30 shown in FIG. 1, the upper die plate 330 does not make use of four groups of ten bridge inserts. Instead, the upper die plate 330 only includes a first group of ten bridge inserts 336a and a second group of ten bridge inserts 336b that are both positioned on the same side of upper die plate 330. In this regard, by arranging the first group of ten bridge inserts 336a and the second group of ten bridge inserts 336b in such a manner, an increased amount of heat distribution and transfer can be present in the portions of the upper die plate 330 and hot press assembly 310 adjacent to the first group of ten bridge inserts 336a and to the second group of ten bridge inserts 336b, while a decreased amount of heat distribution and transfer may be present in other portions of the upper die plate 330 and hot press assembly distal 310 that are distal to the first group of ten bridge inserts 336a and to the second group of ten bridge inserts 336b.

Figure 17:
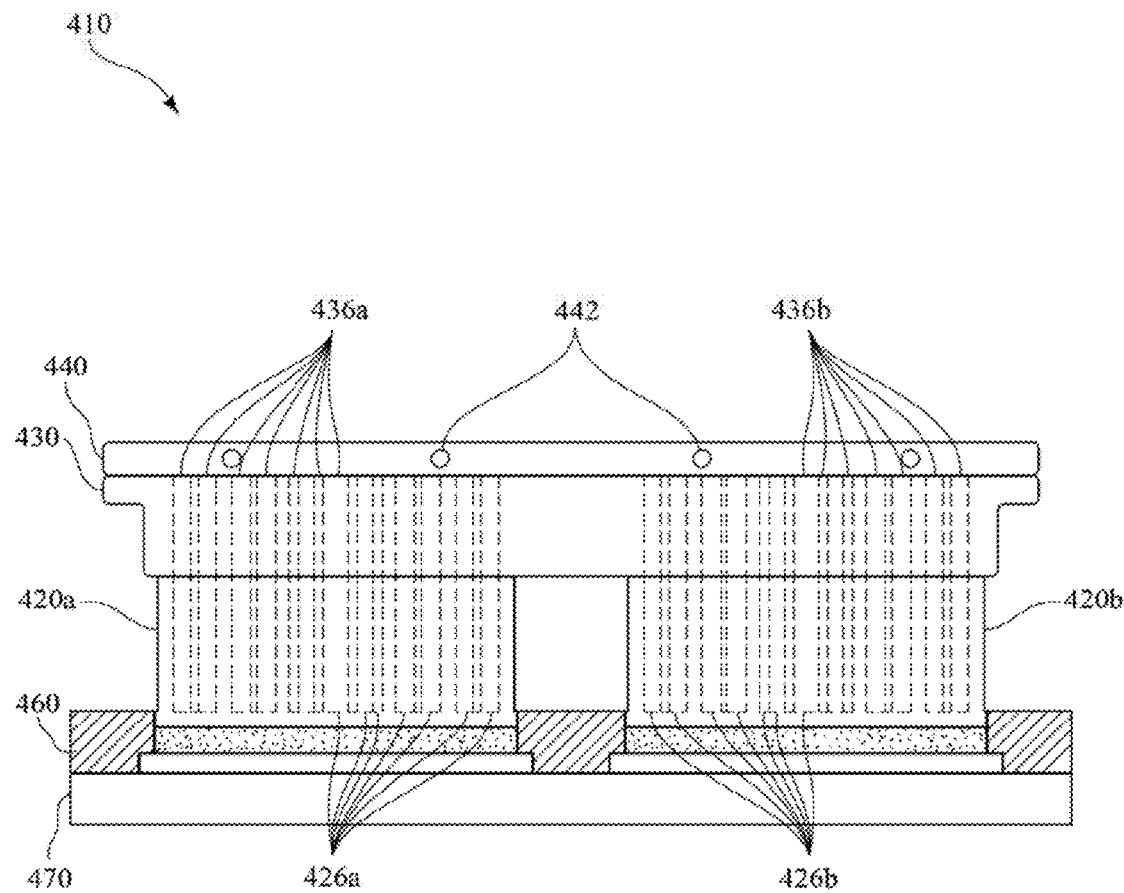
FIG. 17 is a side view of another exemplary hot press assembly made in accordance with the present invention, and showing a portion of the middle die plate of the hot press assembly partially cut away.
Figure 18A:
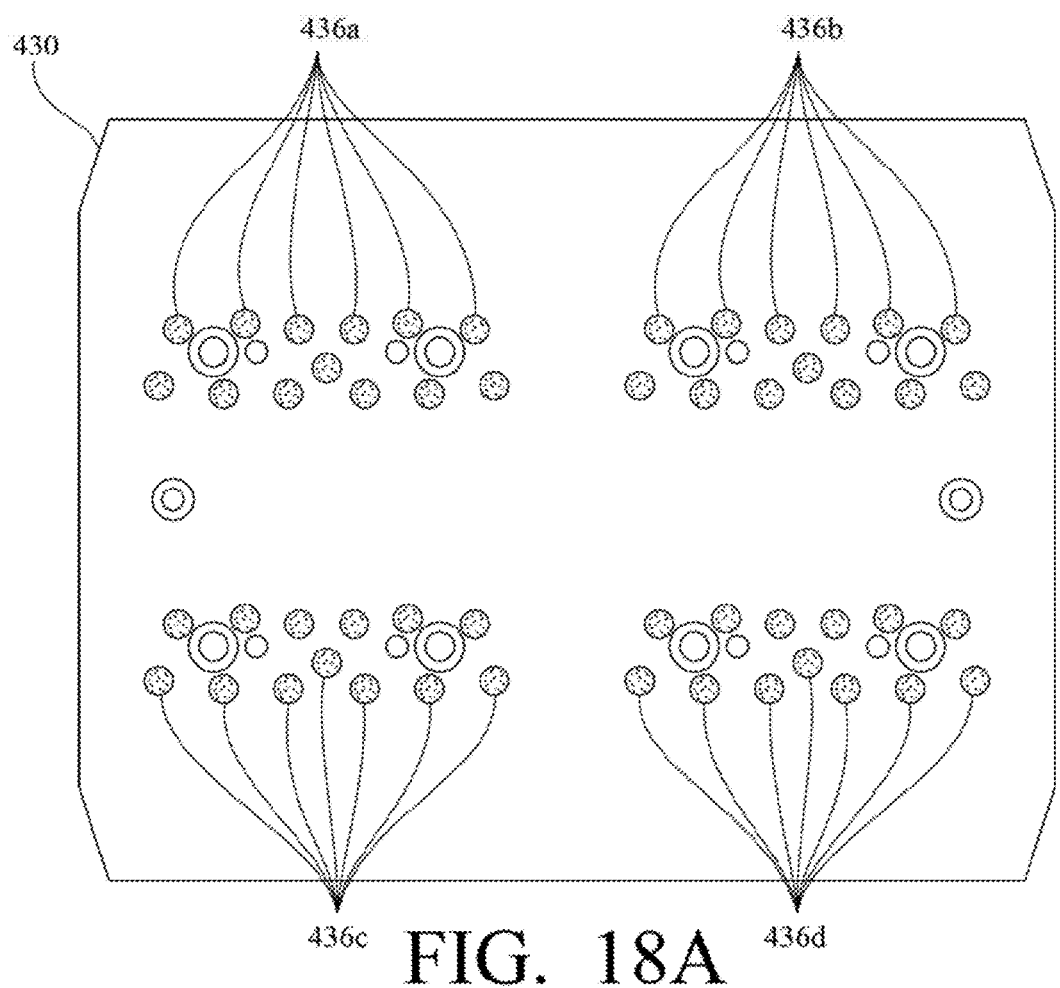
FIG. 18A is a top view of the upper die plate of the exemplary hot press assembly shown in FIG. 17 and showing bridge inserts positioned in the upper die plate.
Figure 18B:
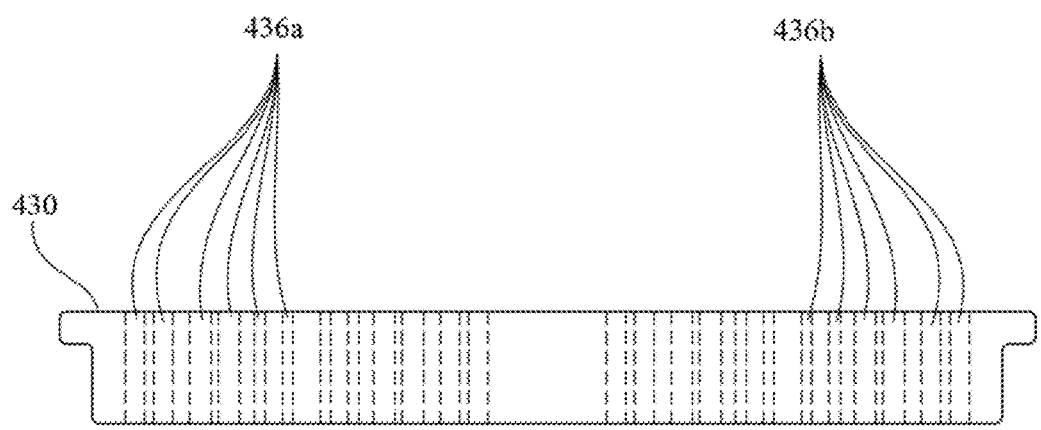
FIG. 18B is a side view of the upper die plate of the exemplary hot press assembly of FIG. 17, and showing the bridge inserts in dashed lines extending through the upper die plate.
Figure 19A:
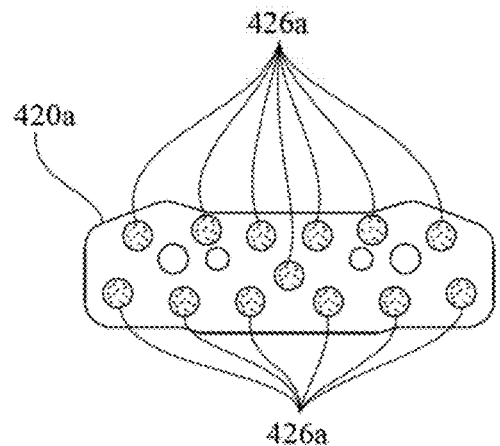
FIG. 19A is a top view of a punch of the exemplary hot press assembly of FIG. 17, and showing conductive inserts positioned in the punch.
Figure 19B:
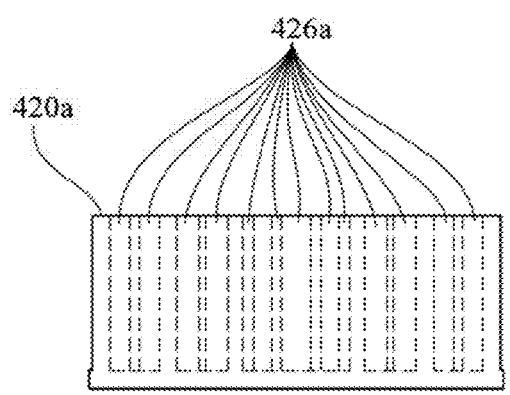
FIG. 19B is a side view of a punch of the exemplary hot press assembly of FIG. 17, and showing the conductive inserts in dashed lines extending through the punch.

As yet another refinement to the hot press assemblies of the present invention, while the exemplary hot press assemblies 10, 110, 210, 310 described herein with reference to FIGS. 1, 5, 9, and 13 make use of no more than ten bridge inserts or ten conductive inserts per group, the hot press assemblies of the present invention are not limited to such arrangements and can include a greater number of conductive inserts in various configurations to increase the heat distribution and transfer across an exemplary hot press assembly. For instance, and referring now to FIGS. 17, 18A-18B, and 19A-19B, in a further embodiment of the present invention, another exemplary hot press assembly 410 is provided that comprises a heat platen 440 including heating elements 442, an upper die plate 430, four, substantially identical punches (with only the first punch 420a and the second punch 420b and their respective conductive inserts 426a, 426b being shown in FIG. 17), a middle die plate 460, and a lower die plate 470. Unlike the hot press assemblies 10, 110, 210, 310 shown in FIGS. 1, 5, 9, and 13, however, the hot press assembly 410 includes four groups of thirteen bridge inserts 436a, 436b, 436c, 436d positioned in the upper die plate 430. Furthermore, and as shown best in the detailed view of the first punch in FIG. 19A, the first punch 420a, as well as the remainder of the punches in the hot press assembly 410, includes thirteen conductive inserts 426a.

The presently-disclosed subject matter is further illustrated by the following specific but non-limiting examples. In some instances, the following examples may include compilations of data that are representative of data gathered at various times during the course of development and experimentation related to the present invention.

EXAMPLES

Example 1—Manufacturing of Brake Pads with Hot Press Assemblies Having Increased Thermal Conductivity To analyze the effect on the temperature in a hot press assembly as well as the physical properties of a final brake pad, a series of brake pads were manufactured using a hot press assembly where ten, three-eighth inch copper rods were included as bridge inserts in the upper die plate of the hot press assembly, and where ten, three-eighth inch copper rods were included as conductive inserts in each of the four punches of the hot press assembly (see, e.g., FIGS. 1, 2A-2B, and 3A-3B). Briefly, after machining the upper die plate and punches of the hot press assembly and inserting the copper rods, the process of manufacturing the brake pads began by attaching the four punches with the conductive inserts to the upper die plate with the bridge inserts, and then attaching the upper die plate to a heat platen to form the upper portion of the hot press assembly. Brake pad backing plates were then positioned on a lower die plate of the hot press assembly, and a middle die plate was subsequently positioned atop the lower die plate such that the middle die plate partially overlapped the backing plate and formed cavities that were aligned with the backing plates. A friction material was then placed within the cavities atop the backing plates, and electrical current was applied to the heating elements in the heat platen to raise the temperature of the heat platen and, consequently, the temperature of the upper die plate and punches to an operational temperature. Upon reaching the operational temperature, the upper portion of the hot press assembly was lowered until the punches entered a respective cavity formed by the middle die plate and then compressed and heated the friction material until the friction material was thermally molded onto the backing plates to produce brake pads. The upper portion of the hot press assembly was then raised and the finished brake pads were removed, and the process was subsequently repeated to produce multiple sets of brake pads.

Figure 4A:
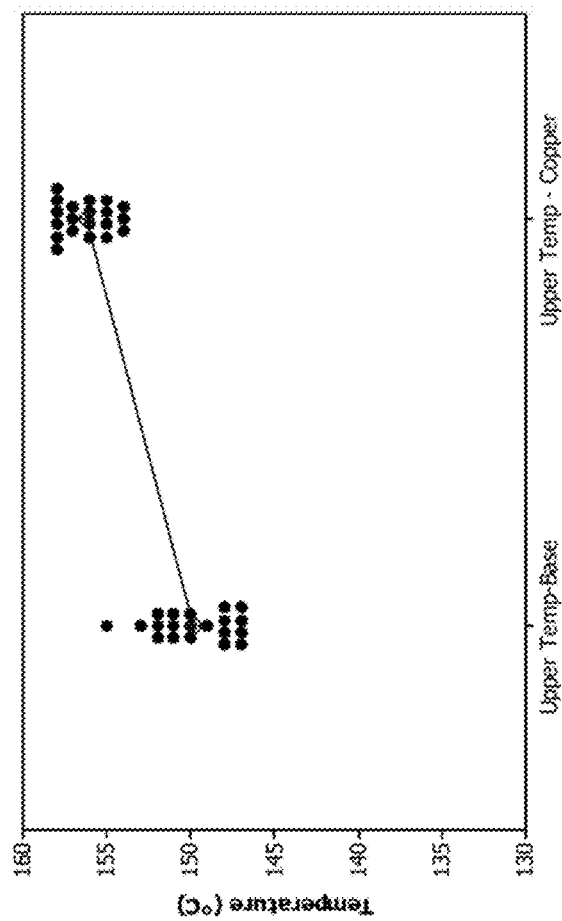
FIG. 4A is a graph showing upper die plate temperatures in the upper die plate of the exemplary hot press assembly of FIG. 1 (Upper Temp—Copper) and in a standard hot press assembly that makes use of an upper die plate that does not include bridge inserts (Upper Temp—Base)
Figure 4B:
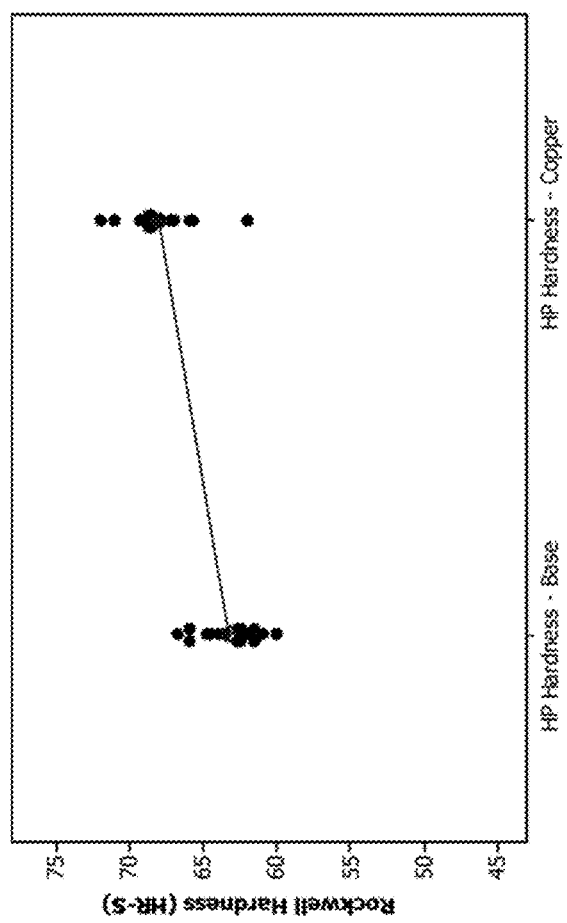
FIG. 4B is a graph showing the hardness of brake pads produced by the exemplary hot press assembly of FIG. 1 (HP Hardness—Copper) and in brake pads produced by a standard hot press assembly (HP Hardness—Base)
Figure 4C:
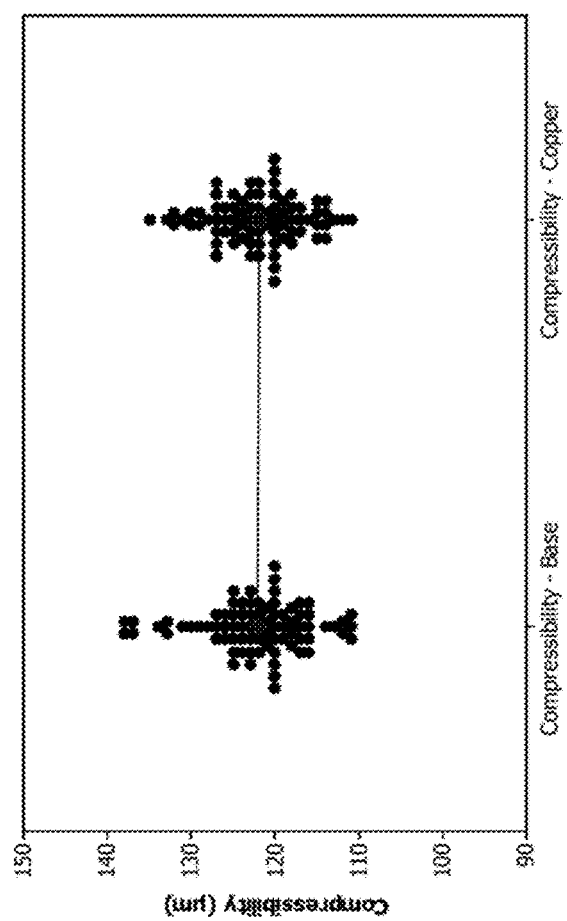
FIG. 4C is a graph showing the compressibility of brake pads produced by the exemplary hot press assembly of FIG. 1 (Compressibility—Copper) and in brake pads produced by a standard hot press assembly (Compressibility—Base)

During the manufacturing of the various brake pads, the temperature of the hot press assembly was continually monitored such that the operational parameters of the newly-developed hot press assembly could be compared against a control hot press assembly that did not include bridge inserts in an upper die plate or conductive inserts in punches, and such that any differences in operational parameters could then be compared to the physical characteristics of the resulting brake pads. As shown in FIG. 4A, the inclusion of the copper bridge inserts in the upper die plate and the copper conductive inserts in the punches of the newly-developed hot press assembly resulted in an average temperature of the upper die plate of 156.25° C. (±1.48° C.) as compared to a temperature of 149.80° C. (±2.31° C.) in an upper die plate of a control hot press assembly (i.e., one that did not include thermally-conductive inserts). In this regard, and as shown in FIG. 4B and measure by a Rockwell Hardness Machine (SAE-J2654 8-04), the increased temperature and decreased temperature variability in the newly-developed hot press assembly was found to produce brake pads having higher hardness values (67.98 HRS) as compared to the hardness values observed in brake pads produced by a control hot press assembly (63.25 HRS). Furthermore, and as shown in FIG. 4C and as measured by a compression tester (SAE-J246), although the average compressibility of the brake pads produced by the newly-developed hot press assembly was similar to those produced by the control hot press assembly, a decreased amount of variability in the compression of the brake pads (i.e., a smaller standard of deviation) was observed in the brake pads produced by the newly developed hot press assembly (5.22 μm for the brake pads produced by the newly developed hot press assembly as compared to 6.10 μm for the brake pads produced by the control hot press assembly).

During the manufacturing process, it was typical for a hot press assembly to require several cycles before the temperature of the upper, middle, and lower die plates stabilized. Accordingly, the brake pads produced during those first few cycles often exhibited much larger standards of deviation with respect to hardness and compressibility. As such, during the manufacturing of the brake pads with the newly-developed hot press assembly, portions of the analysis were limited to those brake pads that were produced during only the first three cycles of the manufacturing process, and it was found that not only did the newly-developed hot press assembly exhibit less temperature variability, but it was also found that the brake pads produced by the newly-developed hot press assembly exhibited much greater consistency in terms of hardness values and compressibility than those brake pads produced by a control hot press assembly. In this regard, and without wishing to be bound by any particular theory or mechanism, it was believed that the bridge inserts and conductive inserts included in the newly-developed hot press assembly allowed for quicker temperature stabilization, which, in turn, resulted in improved hardness and compressibility values.

Figure 4D:
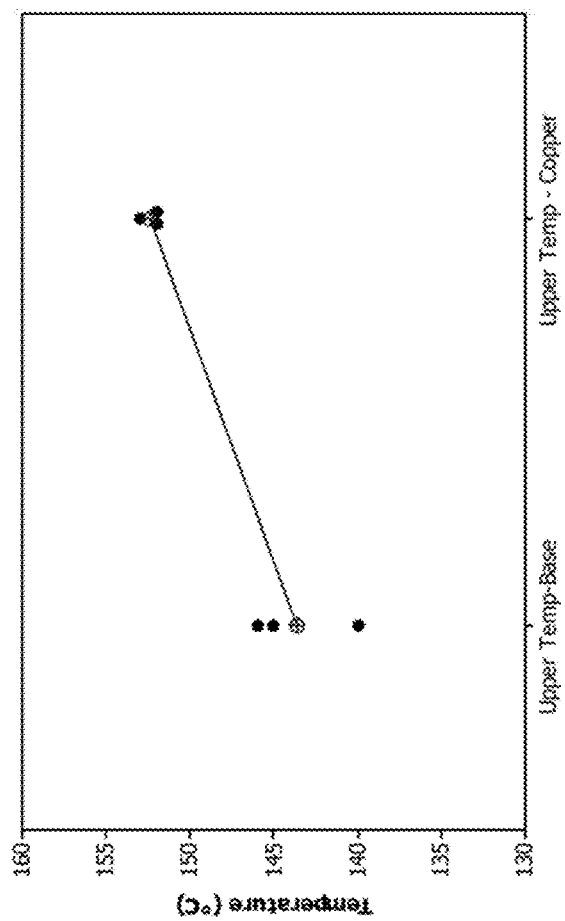
FIG. 4D is a graph showing upper die plate temperatures in the first three brake pad manufacturing cycles performed by the exemplary hot press assembly of FIG. 1 (Upper Temp—Copper) and in the first three brake pad manufacturing cycles performed by a standard hot press assembly (Upper Temp—Base)
Figure 4E:
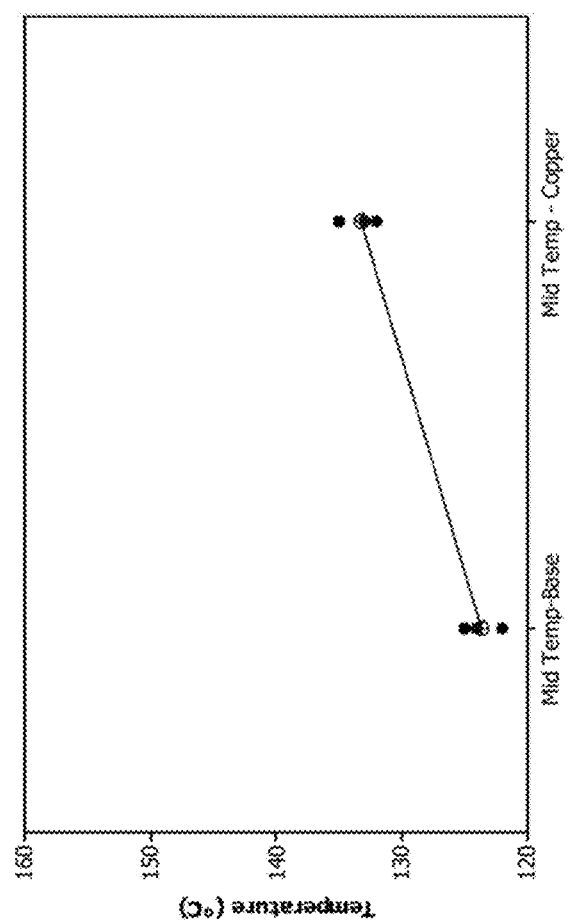
FIG. 4E is a graph showing middle die plate temperatures in the first three brake pad manufacturing cycles performed by the exemplary hot press assembly of FIG. 1 (Upper Temp—Copper) and in the first three brake pad manufacturing cycles performed by a standard hot press assembly (Upper Temp—Base)
Figure 4F:
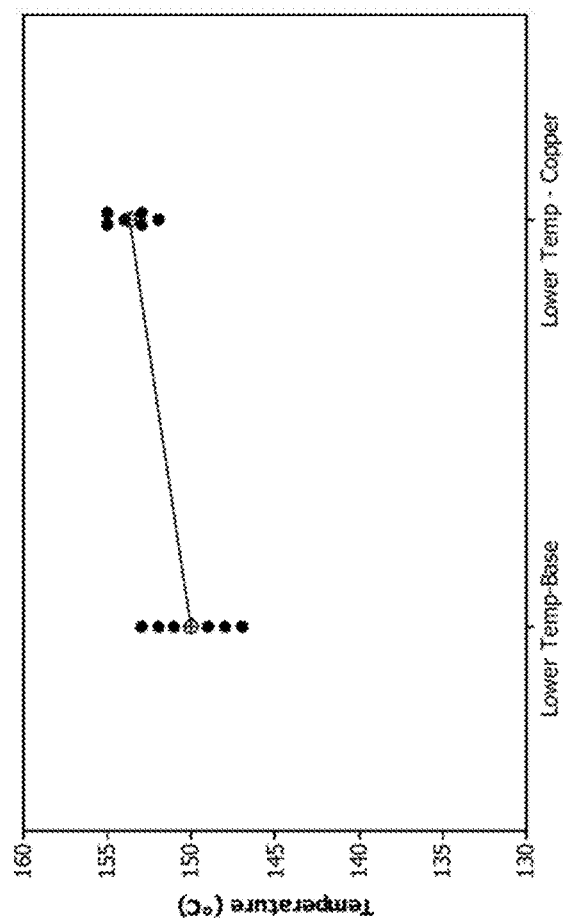
FIG. 4F is a graph showing lower die plate temperatures in the first three brake pad manufacturing cycles performed by the exemplary hot press assembly of FIG. 1 (Upper Temp—Copper) and in the first three brake pad manufacturing cycles performed by a standard hot press assembly (Upper Temp—Base)
Figure 4G:
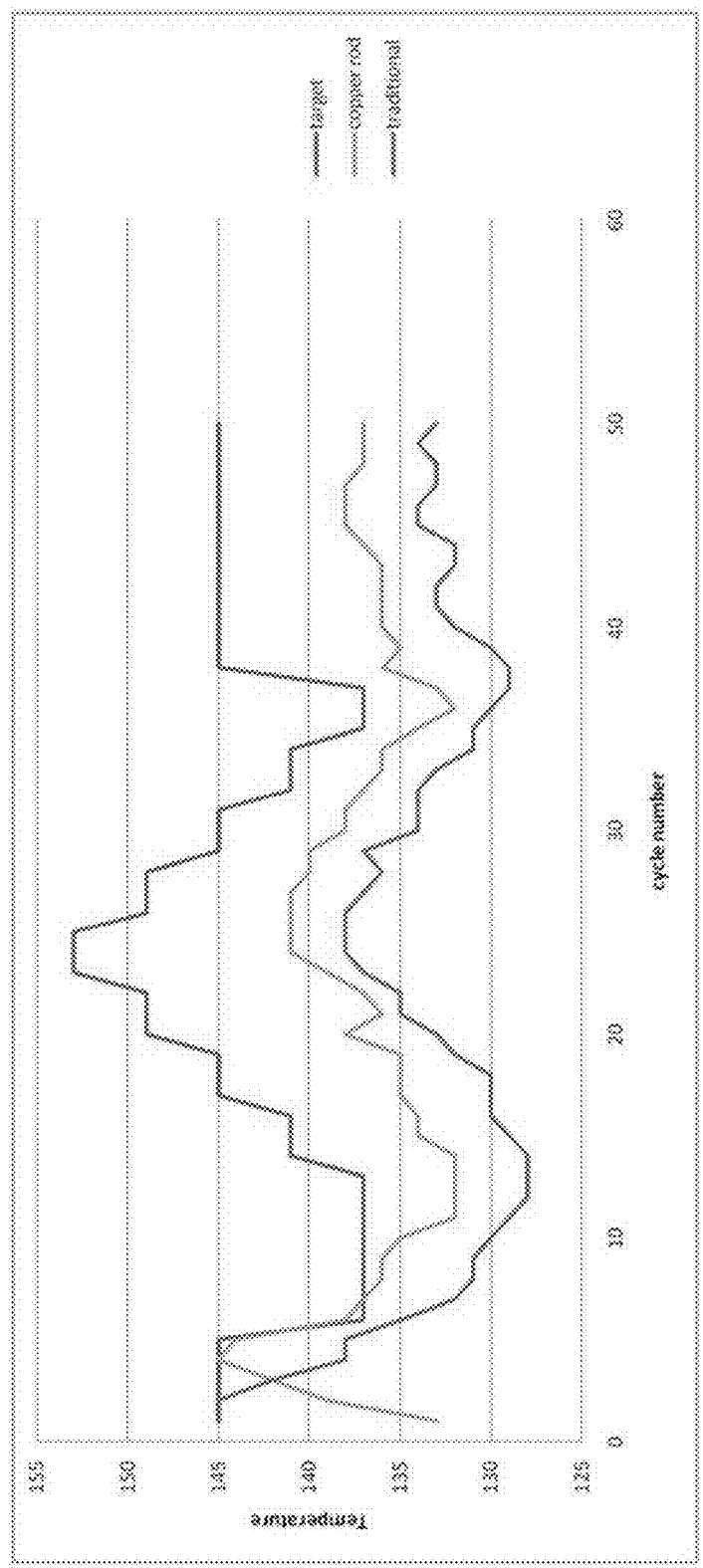
FIG. 4G is a graph showing the ability of the exemplary hot press assembly of FIG. 1 (Copper Rod) and the ability of a standard hot press assembly (traditional) to adjust to a target temperature (i.e., a machine setting) as the target temperature is varied over multiple cycles in a brake pad manufacturing process, and showing that when the exemplary hot press assembly of FIG. 1 is utilized, the target temperature or machine setting can be reduced to achieve the same temperature observed in a standard hot press assembly.

As shown in FIGS. 4D-4F, as compared to a control hot press assembly that did not make use of bridge inserts or conductive inserts, the newly-developed hot press assembly exhibited a higher temperature and less temperature variability during the first three manufacturing cycles in not only the upper die plate (152.33° C. versus 143.67° C.; FIG. 4D), but also in the middle die plate (133.33° C. versus 123.67° C.; FIG. 4E) and the lower die plate (153.67° C. versus 150.00° C.; FIG. 4F). Indeed, as shown in FIG. 4G, the newly-developed hot press assembly then continued to more closely match the target temperature for the hot press assembly as the machine progressed through its natural temperature curve in the manufacturing process.

Figure 4H:
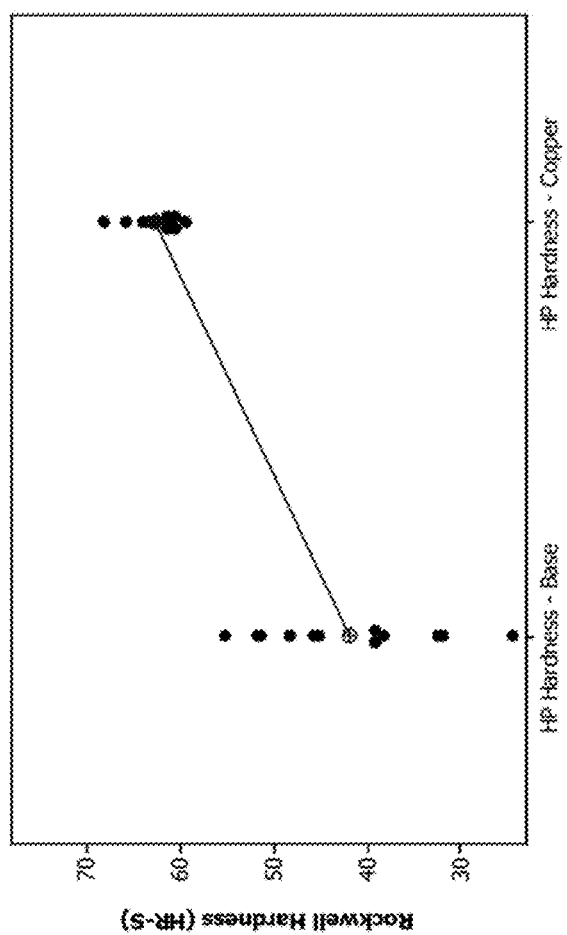
FIG. 4H is a graph showing the hardness of brake pads produced in the first three brake pad manufacturing cycles performed by the exemplary hot press assembly of FIG. 1 (HP Hardness—Copper) and in the first three brake pad manufacturing cycles performed by a standard hot press assembly (HP Hardness—Base)
Figure 4I:
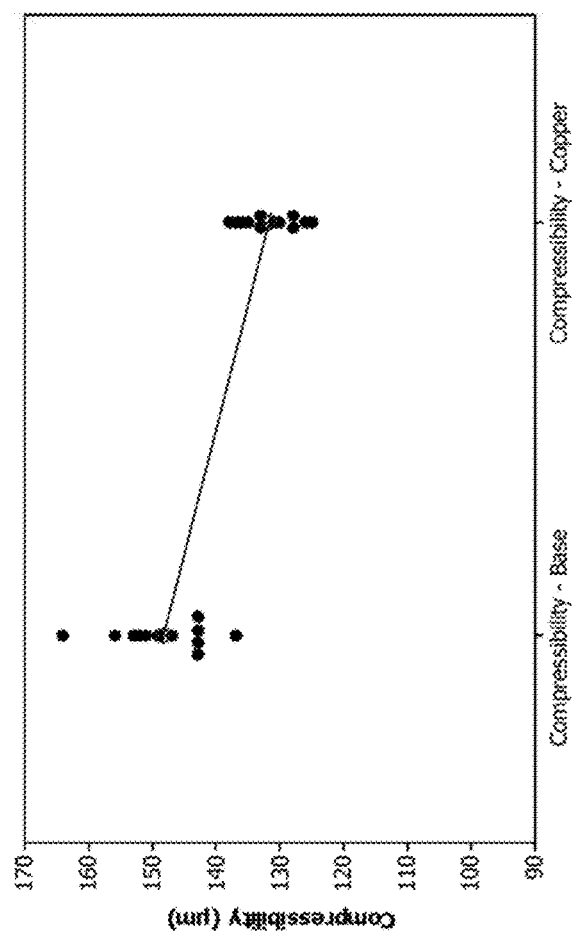
FIG. 4I is a graph showing the compressibility of brake pads produced in the first three brake pad manufacturing cycles performed by the exemplary hot press assembly of FIG. 1 (Compressibility—Copper) and in the first three brake pad manufacturing cycles performed by a standard hot press assembly (Compressibility—Base)
Figure 4J:
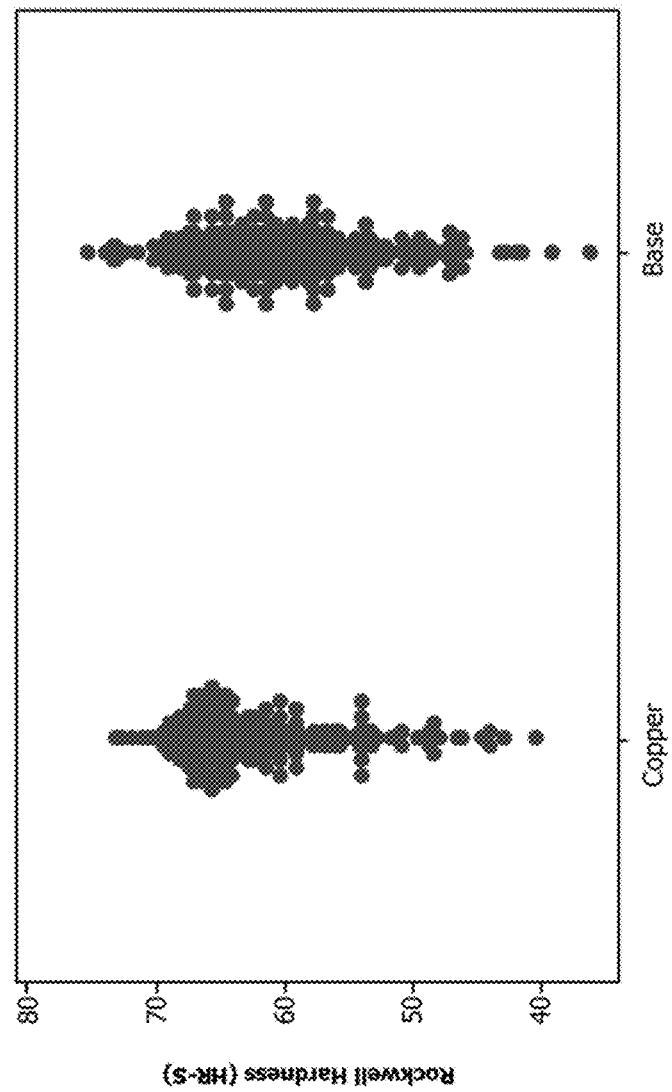
FIG. 4J is a graph showing the hardness of brake pads produced by the exemplary hot press assembly of FIG. 1 (Copper) and of brake pads produced by a standard hot press assembly (Base), where the hardness of the brake pads was measured immediately after hot pressing friction material to a backing plate.
Figure 4K:
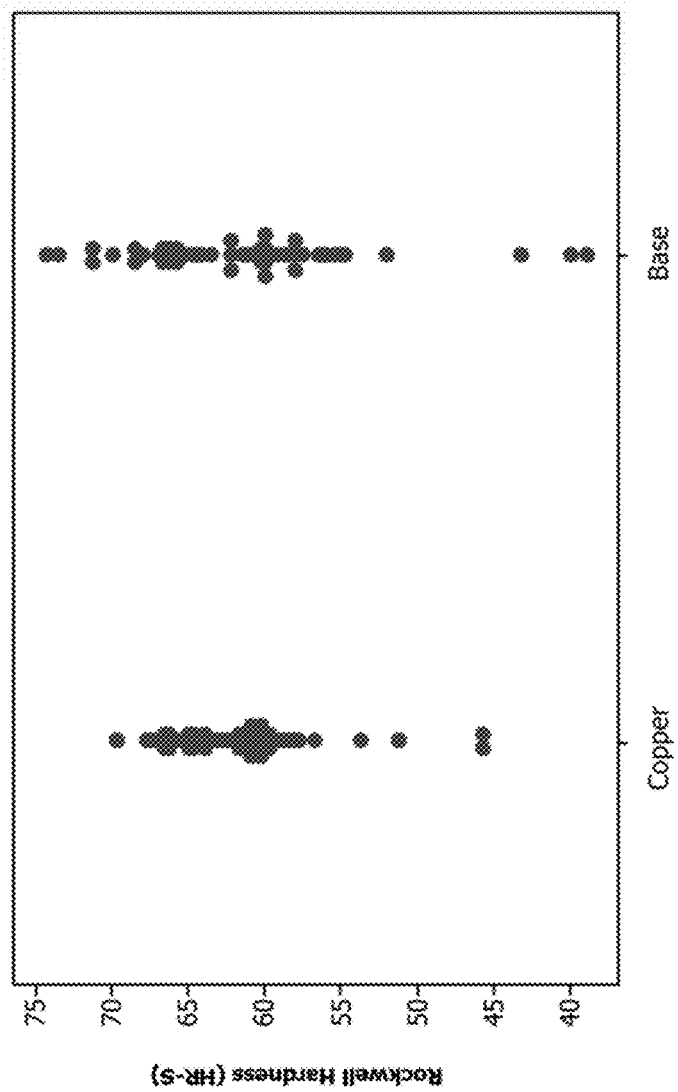
FIG. 4K is a graph showing the hardness of brake pads produced by the exemplary hot press assembly of FIG. 1 (Copper) and of brake pads produced by a standard hot press assembly (Base), where the hardness of the brake pads was measured after curing the friction material.
Figure 4L:
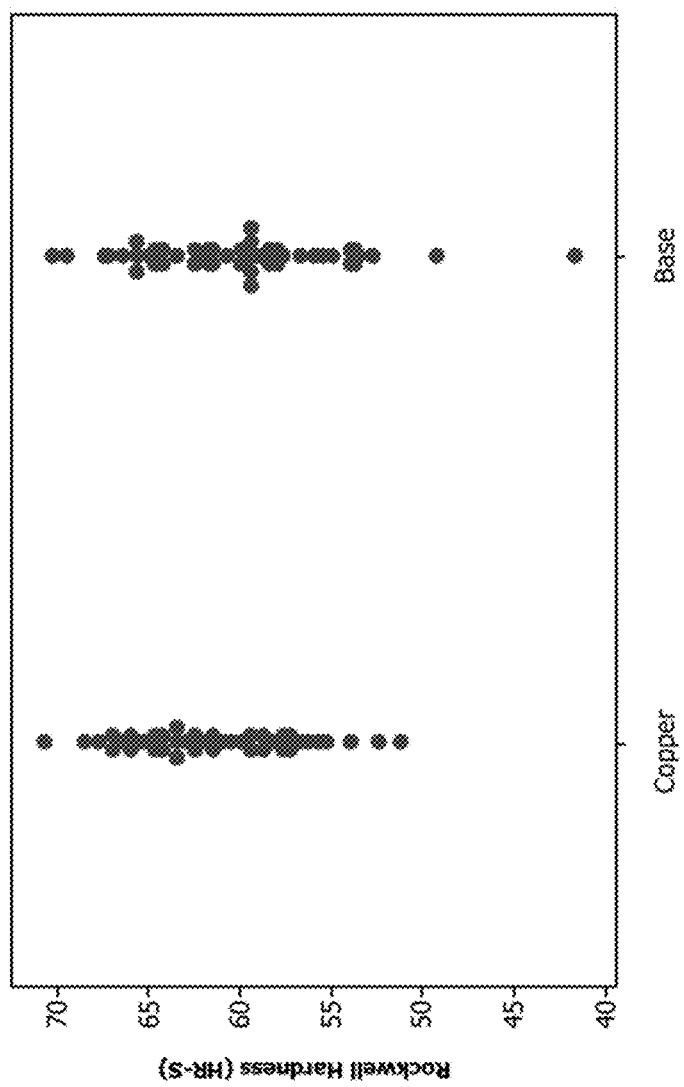
FIG. 4L is a graph showing the hardness of brake pads produced by the exemplary hot press assembly of FIG. 1 (Copper) and of brake pads produced by a standard hot press assembly (Base), where the hardness of the brake pads was measured after grinding of the friction material.

Advantageously, as indicated above and as shown in FIG. 4H, the increased control over the temperature of the newly-developed hot press assembly also resulted in greater hardness values of the brake pads produced by the newly-developed hot press assembly in the first three cycles (62.63±2.47) as compared to the hardness values of the brake pads that were produced by a control hot press assembly that did not include copper bridge inserts or conductive inserts (41.96±9.29). Furthermore, as shown in FIG. 4I, the compressibility of the brake pads produced by the newly-developed hot press assembly decreased to 131.67 μm (±4.36) as compared to a compressibility of 148.42 μm (±7.33) in the brake pads produced by the control hot press assembly. Additionally, as shown in FIGS. 4J-4L, the increased hardness of the brake pads produced by the newly-developed hot press assembly was apparent not only immediately after the friction material was hot pressed onto the backing plate (FIG. 4J), but also after the friction material was cured (FIG. 4K) and ground into a final geometry (FIG. 4L).

Example 2—Analysis of Brake Pad Manufacturing Using Hot Press Assemblies Having Variable Numbers and Configurations of Bridge and Conductive Inserts During the manufacturing of brake pads using a hot press assembly, it is appreciated that the thermal conductivity of the punch in a hot press assembly is of importance in providing the heat necessary to thermally mold the friction material. As such, further experiments were undertaken to assess whether including various amounts and configurations of bridge inserts in an upper die plate and/or conductive inserts in the punches of a hot press assembly would improve the thermal conductivity of the punch and affect the physical characteristics of any resulting brake pads. In this regard, in a first set of experiments, a hot press assembly was developed that made use of punches including six, three-eighth inch, copper rod conductive inserts in each of the punches, but that did not include any copper rod/bridge inserts in the upper die plate of the punch (see, e.g., FIGS. 5, 6A-6B, 7A-7B).

Figure 8:
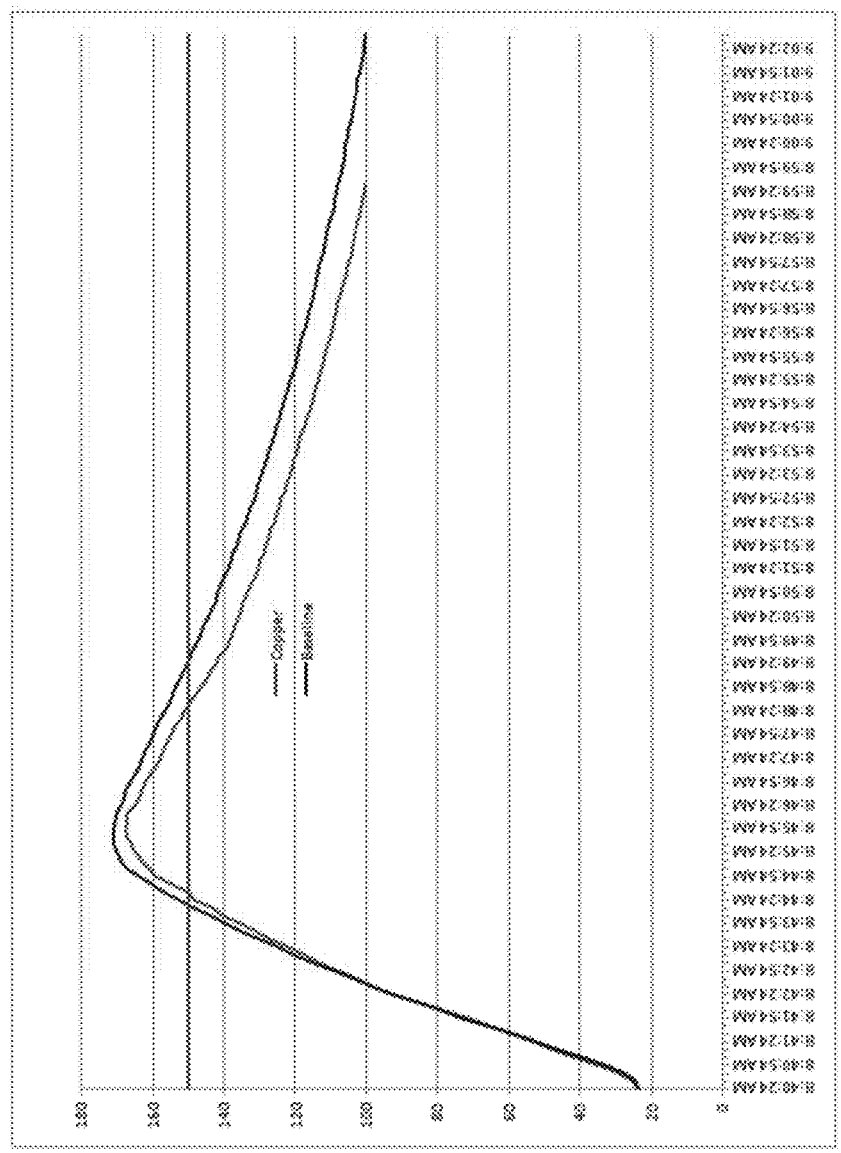
FIG. 8 is a graph showing the change in temperature over time in a punch of a standard hot press assembly (baseline) and in the punch shown in FIGS. 7A-7B (copper) where each punch was placed on a 400° C. hot plate and then removed after the punch reached 150° C.

Upon assembling the new hot press assembly including such punches, improvement in the thermal conductivity of the newly-developed punch was first tested by placing one of the punches on a 400° C. hot plate and removing the punch once it reached a temperature of 150° C. Surprisingly, upon analysis of the results and as shown in FIG. 8, it was observed that there was not a significant difference in the thermal conductivity of the newly-developed punch with the six conductive inserts as compared to a control punch that did not include such conductive inserts.

Figure 12A:
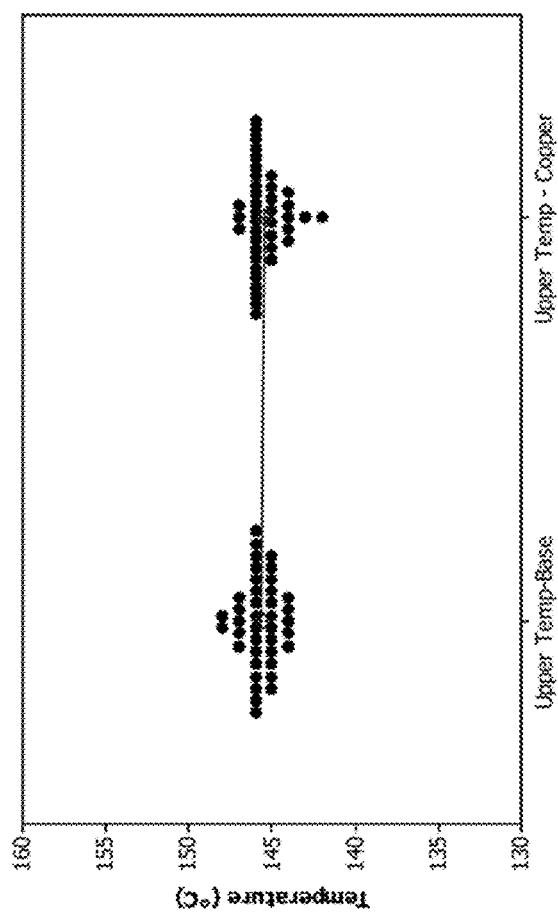
FIG. 12A is a graph showing upper die plate temperatures in an upper die plate of the exemplary hot press assembly of FIG. 9 (Upper Temp—Copper) and in a standard hot press assembly (Upper Temp—Base)
Figure 12B:
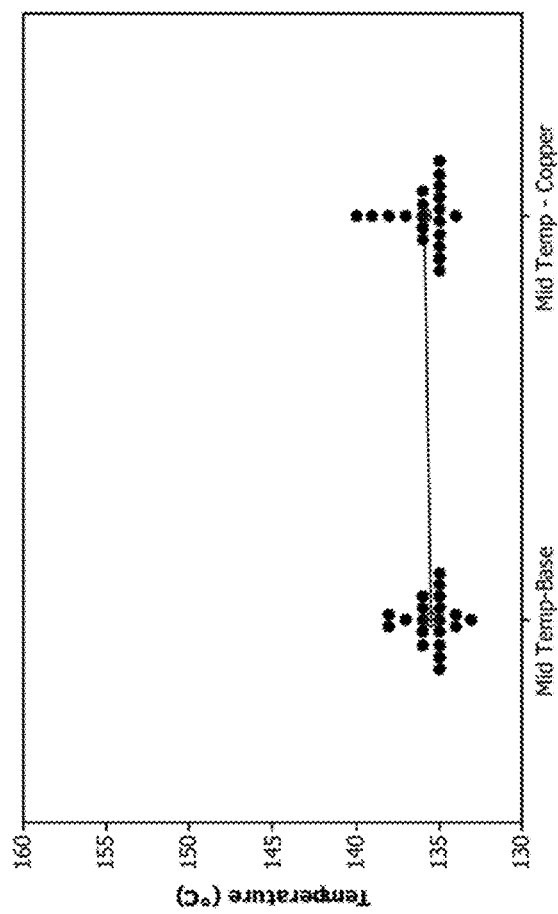
FIG. 12B is a graph showing middle die plate temperatures in a middle die plate of the exemplary hot press assembly of FIG. 9 (Mid Temp—Copper) and in a standard hot press assembly (Mid Temp—Base)
Figure 12C:
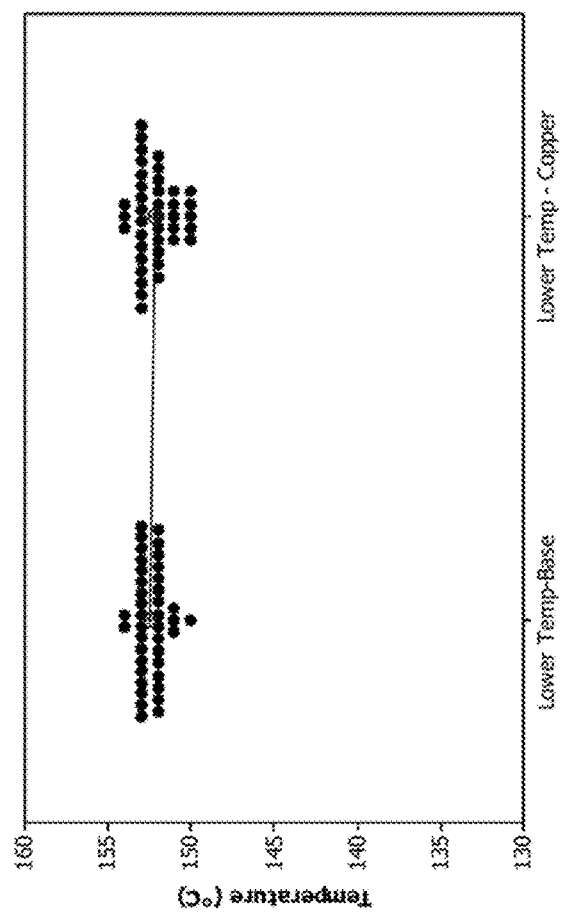
FIG. 12C is a graph showing lower die plate temperatures in a lower die plate of the exemplary hot press assembly of FIG. 9 (Lower Temp—Copper) and in a standard hot press assembly (Lower Temp—Base)
Figure 12D:
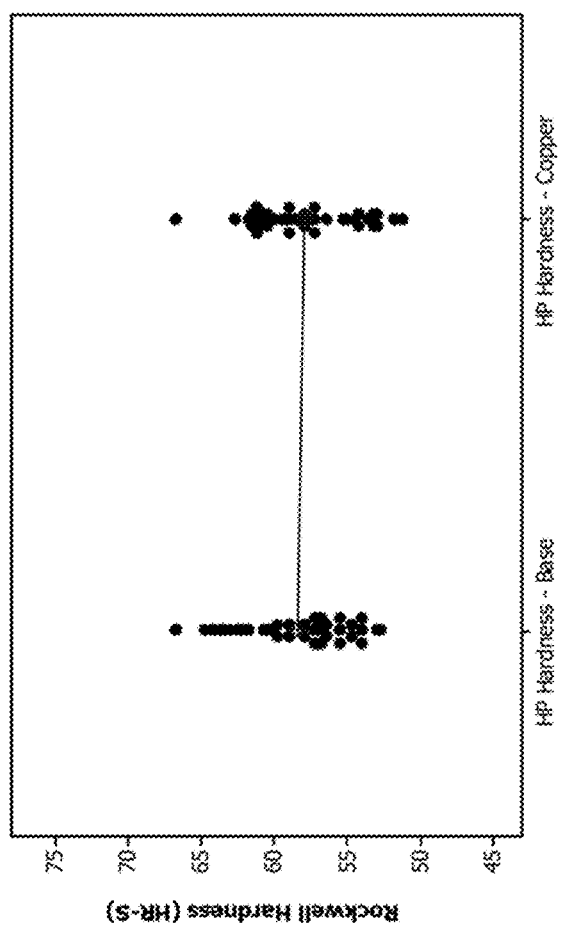
FIG. 12D is a graph showing the hardness of brake pads produced by the exemplary hot press assembly of FIG. 9 (HP Hardness—Copper) and by a standard hot press assembly (HP Hardness—Base)
Figure 12E:
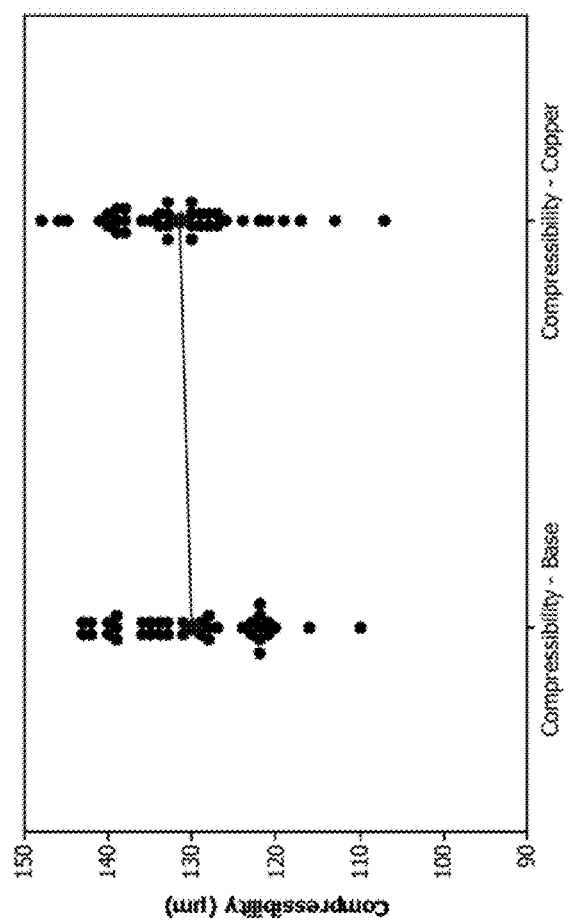
FIG. 12E is a graph showing the compressibility of brake pads produced by the exemplary hot press assembly of FIG. 9 (Compressibility—Copper) and by a standard hot press assembly (Compressibility—Base)

In light of those results, further experiments were then undertaken to assess whether increasing the number of thermally-conductive inserts in each punch would increase the thermal conductivity of the punches and potentially improve the physical characteristics of brake pads produced with the newly-developed punches. In this regard, a further hot press assembly was developed that included ten, three-eighth inch, copper rod conductive inserts in each of the punches in the same manner as described above, and, again, did not include any copper bridge inserts in the upper die plate of the hot press assembly (see, e.g., FIGS. 9, 10A-10B, 11A-11B). Surprisingly, upon analysis of the results using the further developed hot press assembly, and as shown in FIGS. 12A-12C, there was no appreciable increase in the temperature of the upper die plate (FIG. 12A), the middle die plate (FIG. 12B), or the lower die plate (FIG. 12C) of the newly-developed hot press assembly as compared to a control hot press assembly that did not include any thermally-conductive inserts. Furthermore, and as shown in FIGS. 12D-12E, there was also no appreciable change in the hardness or the compressibility of the brake pads produced by the newly-developed hot press assembly.

In view of the results that were obtained using various numbers of thermally-conductive inserts in the punches of a hot press assembly versus those that were obtained by making use of both bridge inserts in an upper die plate and conductive inserts in the punches of a hot press assembly, additional experiments were then undertaken to assess whether the inclusion of conductive inserts in each of the punches and bridge inserts in only certain areas of an upper die plate would affect the performance of the hot press assembly. Briefly, in these experiments, another hot press assembly was developed that included ten, three-eighth inch, copper rod conductive inserts in each of the punches (see, e.g., FIGS. 13 and 15A-15B). The hot press assembly further included two groups of ten, three-eighth inch, copper rod bridge inserts on one side of the upper die plate, but did not include any bridge inserts on the other side of the upper die plate (see, e.g., FIGS. 14A-14B).

Figure 16A:
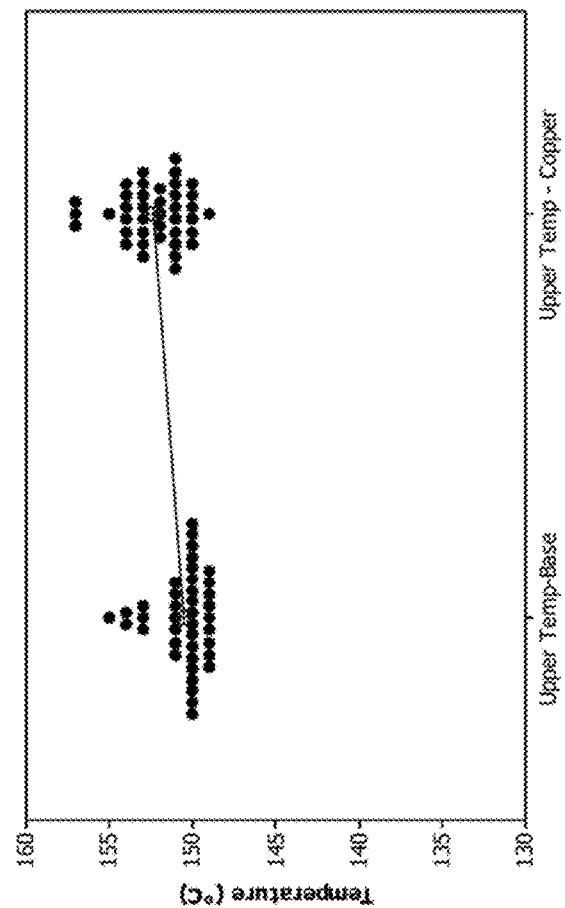
FIG. 16A is a graph showing upper die plate temperatures in an upper die plate of the exemplary hot press assembly of FIG. 13 (Upper Temp—Copper) and in a standard hot press assembly (Upper Temp—Base)
Figure 16B:
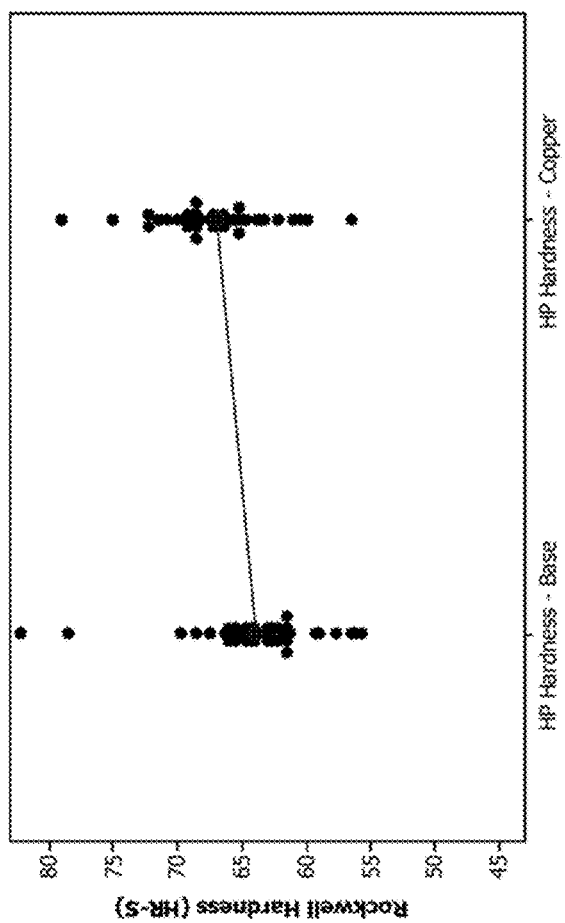
FIG. 16B is a graph showing the hardness of brake pads produced by the exemplary hot press assembly of FIG. 13 (HP Hardness—Copper) and by a standard hot press assembly (HP Hardness—Base)
Figure 16C:
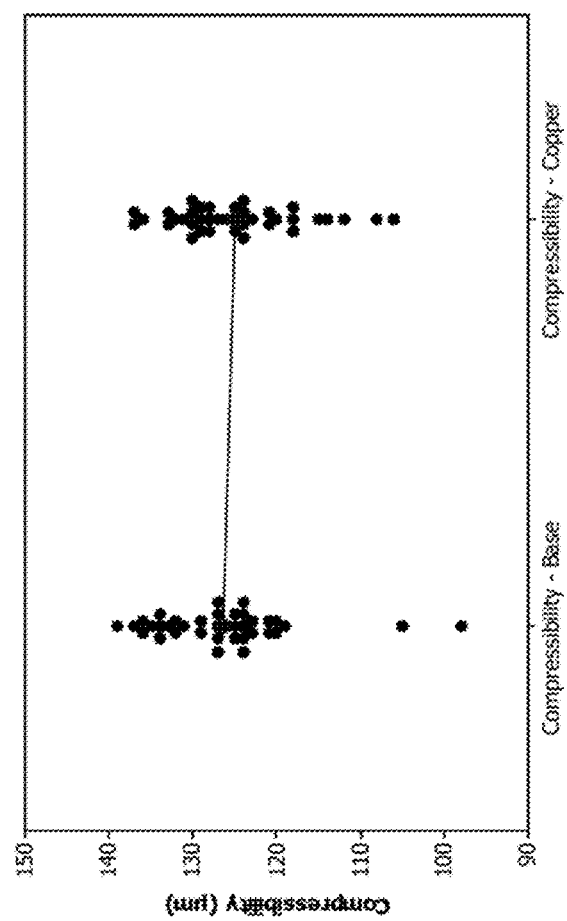
FIG. 16C is a graph showing the compressibility of brake pads produced by the exemplary hot press assembly of FIG. 13 (Compressibility—Copper) and by a standard hot press assembly (Compressibility—Base)

As shown in FIG. 16A, by including the foregoing arrangement of ten conductive inserts in each punch and two groups of ten bridge inserts in an upper die plate, the average temperature of the upper die plate of the newly-developed hot press assembly (152.32° C.) was found to be higher than the temperature of the upper die plate of a control hot press assembly that did not include bridge inserts or conductive inserts (150.50° C.). As shown in FIG. 16B, there was also a modest increase in the hardness of the brake pads produced by the newly-developed hot press assembly (63.93 HRS) versus those produced by the control hot press assembly (66.99 HRS). Despite those results, however, and as shown in FIG. 16C, there was no appreciable change in the compressibility of the brake pads produced by the newly developed hot press assembly (124.95 μm) when compared to the compressibility of the brake pads produced by the control hot press assembly (126.41 μm).

Figure 20A:
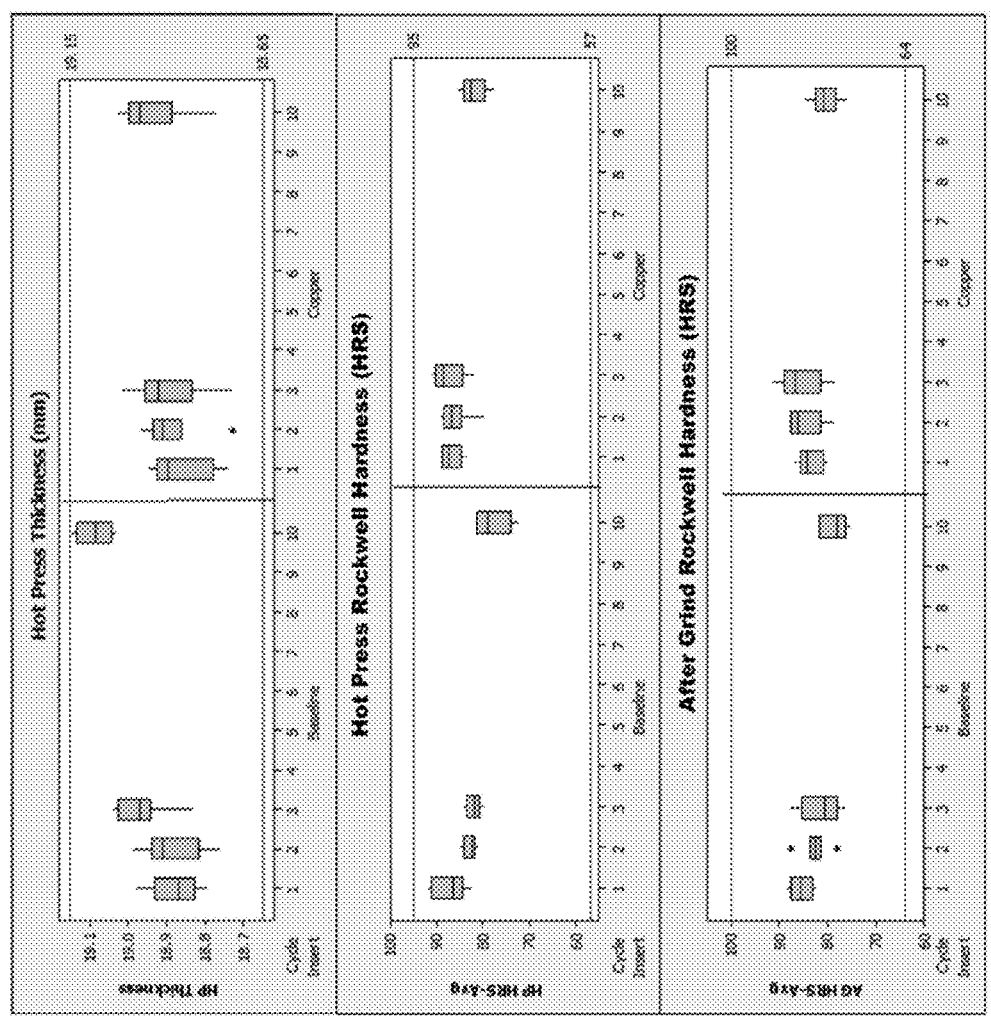
FIG. 20A includes graphs showing the thickness of the hot pressed friction material, the hardness of the friction material immediately after hot pressing the friction material to the backing plate, and the hardness of the friction material after curing and grinding in brake pads produced by the hot press assembly of FIG. 17 (Copper) and produced by a standard hot press assembly (Baseline)
Figure 20B:
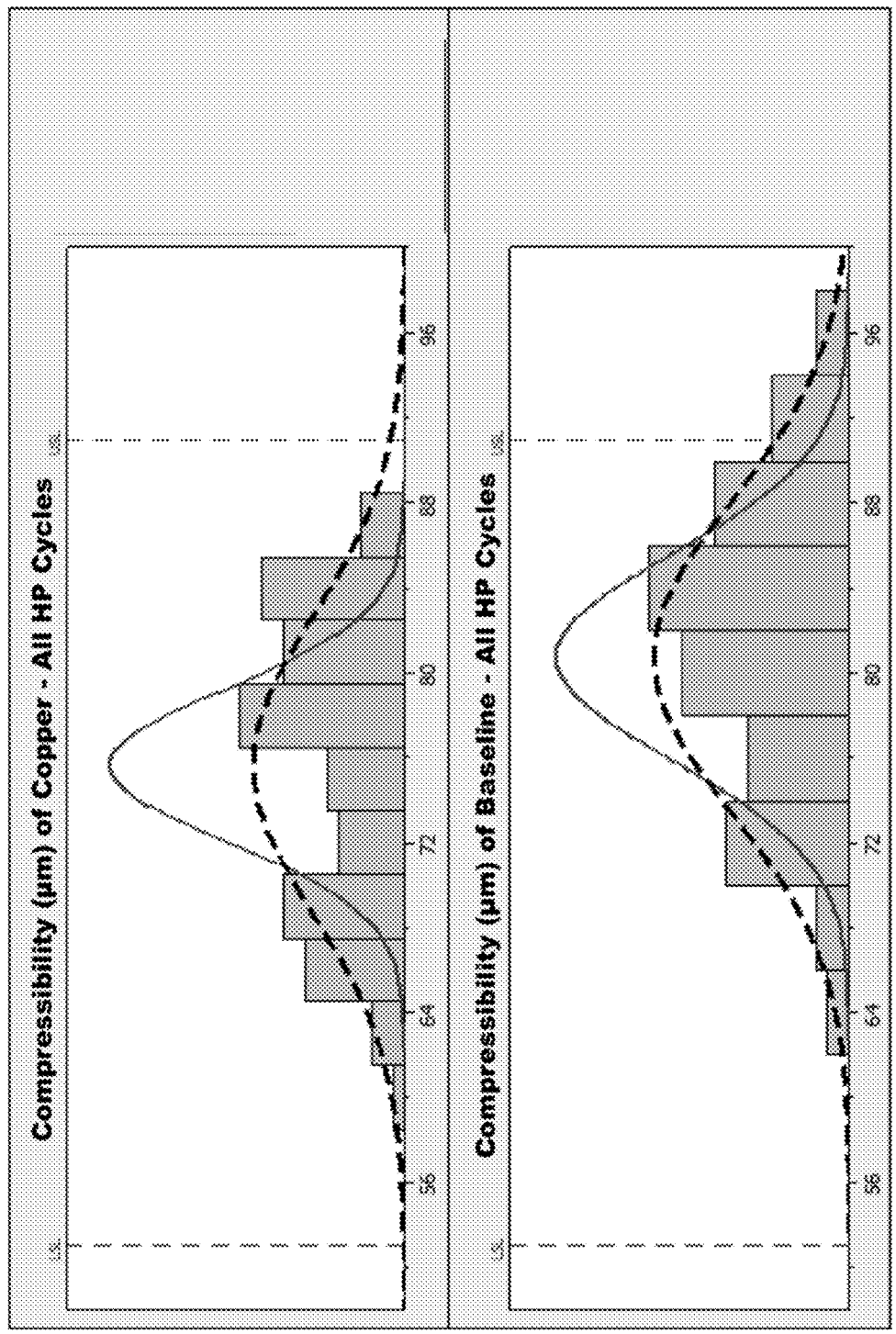
FIG. 20B is a graph showing the compressibility of brake pads produced by the hot press assembly of FIG. 17 (Copper) and produced by a standard hot press assembly (Baseline)
Figure 20C:
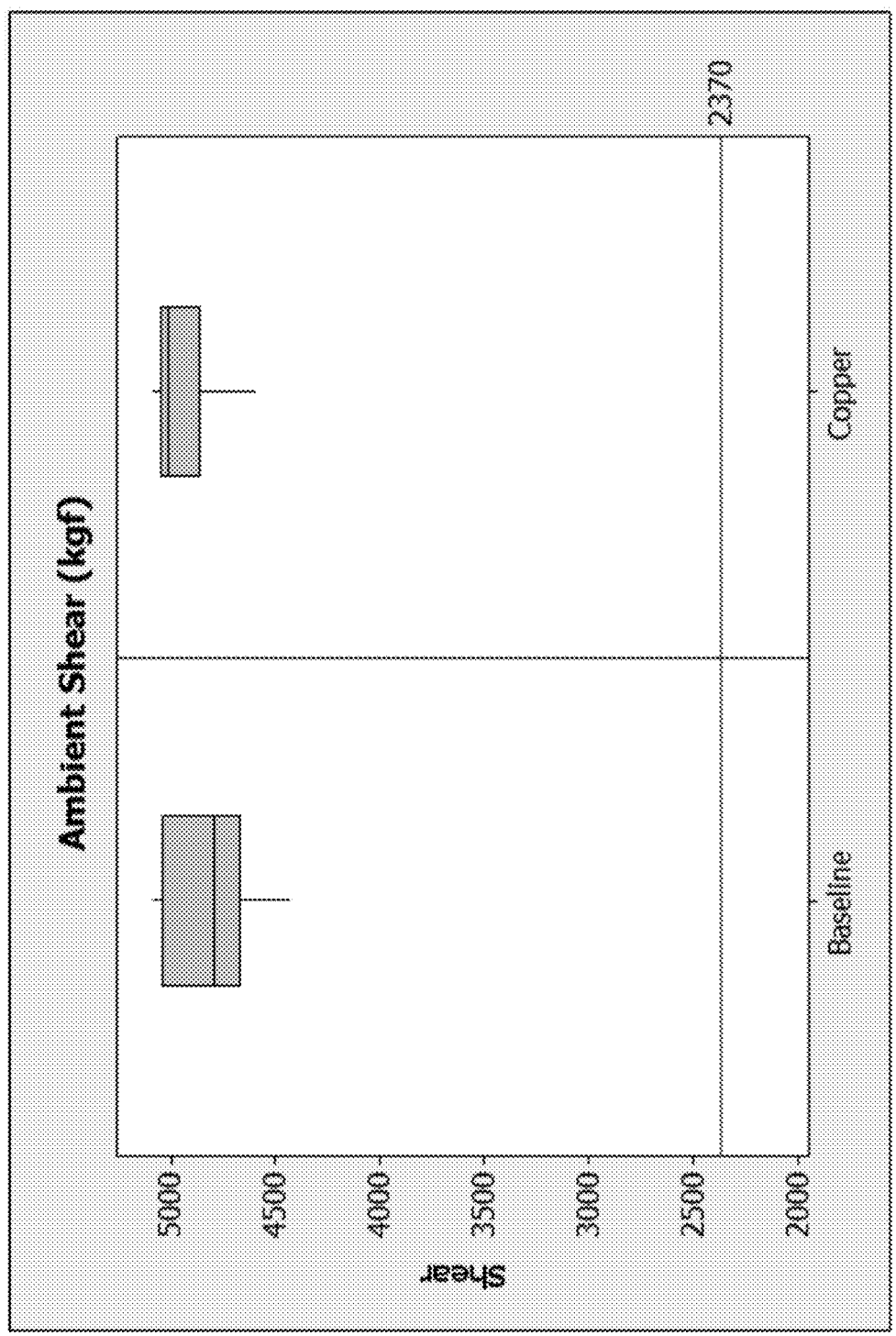
FIG. 20C is a graph showing the shear of brake pads by the hot press assembly of FIG. 17 (Copper) and produced by a standard hot press assembly (Baseline).

In view of the data obtained with a hot press assembly that included ten conductive inserts in each punch and two groups of ten bridge inserts in an upper die plate, additional experiments were then undertaken to further assess the inclusion of bridge inserts in an upper die plate and conductive inserts in the punches of a hot press assembly. In particular, yet another hot press assembly was developed, but alternatively included thirteen, three-eighth inch, copper rod conductive inserts in each of the punches and four groups of thirteen, three-eighth inch, copper rod bridge inserts in an upper die plate (see, e.g., FIGS. 17, 18A-18B, and 19A-19B). Upon analysis of the results from the experiments, and as shown in FIG. 20A, it was observed that the average hardness of the brake pads produced by the hot press assembly including the increased number of bridge inserts and conductive inserts was higher than the hardness of brake pads produced by a control hot press assembly that did not include bridge inserts or conductive inserts, both after being hot pressed as well as after the brake pad was cured and ground into a final geometry. Furthermore, as shown in FIG. 20B, the compressibility of the brake pads produced by the newly-developed hot press assembly (75.68 μm±7.01) was smaller and had less variability than the compressibility of brake pads produced by the control hot press assembly (80.75 μm±7.28). Finally, as shown in FIG. 20C, it was further observed that the shear strength of the brake pads produced by the newly developed hot press assembly after being ground into a final geometry was higher and had less variability than what was observed when the shear strength of brake pads produced by a control hot press assembly was measured.

Throughout this document, various references are mentioned. All such references are incorporated herein by reference, including the references set forth in the following list:

REFERENCES

1. U.S. Pat. No. 5,395,573 to Taguchi, issued Mar. 7, 1995, and entitled "Method of Carrying Preform of Frictional Material and Apparatus Therefor."
2. U.S. Pat. No. 5,603,871 to Koseko, et al., issued Feb. 18, 1997, and entitled "Method for Manufacturing Molded Resin Product and Plastic Mirror."
3. U.S. Pat. No. 5,775,402 to Sach, et al., issued Jul. 7, 1998, and entitled "Enhancement of Thermal Properties of Tooling made by Solid Free Form Fabrication Techniques."
4. U.S. Pat. No. 6,354,361 to Sachs, et al., issued Mar. 12, 2002, and entitled "Tooling Having Advantageously Located Heat Transfer Channels."
5. U.S. Pat. No. 6,413,068 to Steidl, et al., issued Jul. 2, 2002, and entitled "Tire Mold Heat Transfer System."
6. U.S. Pat. No. 7,199,337 to Torisawa, issued Apr. 3, 2007, and entitled "Heating Plate and Process For Producing the Same."
7. U.S. Pat. No. 7,278,197 to Manuel, issued Oct. 9, 2007, and entitled "Method for Producing a Tool."
8. U.S. Pat. No. 8,108,982 to Manuel, et al., issued Feb. 7, 2012, and entitled "Compound Mold Tooling for Controlled Heat Transfer."
9. U.S. Patent Application Publication No. 2006/0249872 by Manuel, et al., published Nov. 9, 2006, and entitled "Compound Mold Tooling for Controlled Heat Transfer."
10. U.S. Patent Application Publication No. 2007/0102837 by Manuel, et al., published May 10, 2007, and entitled "Tool Having Desired Thermal Management Properties and a Method for Producing a Tool Having Desired Thermal Management Properties."
11. U.S. Patent Application Publication No. 2013/0040012 by Sugie, et al., published Feb. 14, 2013, and entitled "Compression Molding Apparatus and Molding Die."

12. Japanese Patent No. 5,337,997 to Jun, et al., issued Dec. 21, 1993, and entitled "Cooling Device of Mold for Molding Plastic."

13. Japanese Patent Publication No. JP2005138366 by Takahiro, et al., published Jun. 2, 2005, and entitled "Precise Die."

It will be understood that various details of the presently disclosed subject matter can be changed without departing from the scope of the subject matter disclosed herein. Furthermore, the foregoing description is for the purpose of illustration only, and not for the purpose of limitation.

What is claimed is:

1. A hot press assembly, comprising:
   an upper die plate having a first surface and a second surface opposite the first surface;
   a punch having an attachment surface positioned adjacent to the second surface of the upper die plate and a pressing surface opposite the attachment surface;
   one or more conductive inserts extending through the punch, each of the one or more conductive inserts extending from the attachment surface and terminating a predetermined distance away from the pressing surface such that each of the one or more conductive inserts terminates before reaching the pressing surface, and each of the one or more conductive inserts having a thermal conductivity greater than a thermal conductivity of the punch; and
   one or more bridge inserts extending through the upper die plate, each of the one or more bridge inserts extending from the first surface of the upper die plate and terminating at the second surface of the upper die plate, each of the one or more bridge inserts of the upper die plate aligned with and contacting a respective one of the one or more conductive inserts of the punch, and each of the one or more bridge inserts having a thermal conductivity greater than a thermal conductivity of the upper die plate.

2. The hot press assembly of claim 1, wherein the punch is comprised of steel.

3. The hot press assembly of claim 2, wherein the steel is SK3 steel.

4. The hot press assembly of claim 1, wherein the one or more conductive inserts are comprised of a copper alloy.

5. The hot press assembly of claim 4, wherein the copper alloy is copper alloy C101.

6. The hot press assembly of claim 1, wherein the one or more conductive inserts extend through the punch to a distance of about 5 mm to about 10 mm away from the pressing surface of the punch.

7. The hot press assembly of claim 1, wherein the one or more conductive inserts comprise about 8% to about 10% by volume of the punch.

8. The hot press assembly of claim 1, wherein the one or more conductive inserts comprise ten conductive inserts.

9. The hot press assembly of claim 1, wherein the one or more conductive inserts comprise thirteen conductive inserts.

10. The hot press assembly of claim 1, wherein the upper die plate is made of steel.

11. The hot press assembly of claim 10, wherein the steel is SK3 steel.

12. The hot press assembly of claim 1, wherein the one or more conductive inserts, the one or more bridge inserts, or both are comprised of a copper alloy.

13. The hot press assembly of claim 12, wherein the copper alloy is copper alloy C101.

14. A hot press assembly, comprising:
    a heat platen including a plurality of heating elements extending through the heat platen;
    an upper die plate having a first surface positioned adjacent to the heat platen and a second surface opposite the first surface;
    a punch having an attachment surface positioned adjacent to the second surface of the upper die plate and a pressing surface opposite the attachment surface;
    one or more conductive inserts extending through the punch, each of the one or more conductive inserts extending from the attachment surface and terminating a predetermined distance away from the pressing surface such that each of the one or more conductive inserts terminates before reaching the pressing surface, and each of the one or more conductive inserts having a thermal conductivity greater than a thermal conductivity of the punch; and
    one or more bridge inserts extending through the upper die plate, each of the one or more bridge inserts extending from the first surface of the upper die plate and terminating at the second surface of the upper die plate, each of the one or more bridge inserts of the upper die plate aligned with and contacting a respective one of the one or more conductive inserts of the punch, and each of the one or more bridge inserts having a thermal conductivity greater than a thermal conductivity of the upper die plate.

15. The hot press assembly of claim 14, wherein the one or more conductive inserts extend through the punch to a distance of about 5 mm to about 10 mm away from the pressing surface of the punch.

16. The hot press assembly of claim 1, wherein each of the one or more conductive inserts and each of the one or more bridge inserts is a copper rod.

* * * * *